(12) United States Patent
Christensen

(10) Patent No.: US 11,584,624 B1
(45) Date of Patent: Feb. 21, 2023

(54) MULTI-PURPOSE JACK APPARATUS AND METHOD OF USE

(71) Applicant: All German Motorsports, Inc., Escondido, CA (US)

(72) Inventor: Hans Martin Christensen, Escondido, CA (US)

(73) Assignee: All German Motorsports, Inc., Escondido, CA (US)

( * ) Notice: Subject to any disclaimer, the term of this patent is extended or adjusted under 35 U.S.C. 154(b) by 163 days.

(21) Appl. No.: 16/994,038

(22) Filed: Aug. 14, 2020

Related U.S. Application Data

(60) Provisional application No. 62/888,218, filed on Aug. 16, 2019.

(51) Int. Cl.
| | |
|---|---|
| *B66F 3/10* | (2006.01) |
| *B66F 3/44* | (2006.01) |
| *B66D 1/66* | (2006.01) |
| *B60S 9/22* | (2006.01) |

(52) U.S. Cl.
CPC ............ *B66F 3/10* (2013.01); *B66D 1/66* (2013.01); *B66F 3/44* (2013.01); *B60S 9/22* (2013.01)

(58) Field of Classification Search
CPC ......... B62B 2203/10; B62B 1/14; B66F 9/06; B66F 7/04; B66F 7/28; B66F 3/44; B66F 3/10; B66F 3/08; B66C 23/48; B60D 1/66; B60S 9/22; B60S 11/00; B60S 9/02; B60S 9/18; B60P 3/125; A62B 3/005; B60T 17/223
USPC ............ 254/133 R, 134, 420, 100, 424, 418, 254/DIG. 5; D34/31; 74/532
See application file for complete search history.

(56) References Cited

U.S. PATENT DOCUMENTS

| | | | | |
|---|---|---|---|---|
| 3,850,409 | A * | 11/1974 | Davis ...................... | B66F 13/00 254/133 R |
| 6,991,050 | B1 * | 1/2006 | Sanford ............. | B62D 53/0857 180/19.1 |
| 7,314,078 | B2 * | 1/2008 | Melino, Jr. ............. | E04G 21/30 160/368.1 |
| 10,730,488 | B2 * | 8/2020 | Moreno .................... | B60S 9/02 |

(Continued)

FOREIGN PATENT DOCUMENTS

| | | | |
|---|---|---|---|
| AU | 2021204066 | * | 1/2022 |
| AU | 2021204066 A1 | * | 1/2022 |
| CN | 112109786 A | * | 9/2020 |

OTHER PUBLICATIONS

The Electric Jack AGM-Products—AGM Products (Year: 2021).*
AGM_PRODUCT_CATALOG_PAGE_1_FRONT_COVER_2020-merged-compressed (Year: 2021).*

*Primary Examiner* — Mahdi H Nejad
(74) *Attorney, Agent, or Firm* — Master Key IP, LLP; Jeromye V. Sartain

(57) ABSTRACT

A jack apparatus has a main jack body defined by telescopically engaged outer and inner tubes, a selectively positionable clamp assembly positioned along the jack body for selective engagement with the object to which a force is to be applied, and a drive assembly located on and within the jack body. In a further related aspect a retainer is configured for being mounted on the object to be moved or lifted and for positively engaging a receiver on the clamp assembly so as to effectively lock the jack to the object being lifted such as a vehicle for safe and effective operation.

20 Claims, 15 Drawing Sheets

(56) References Cited

U.S. PATENT DOCUMENTS

| | | | |
|---|---|---|---|
| 2003/0091417 A1* | 5/2003 | Swann | B62B 5/0083 |
| | | | 414/458 |
| 2013/0142602 A1* | 6/2013 | Barnts | B60P 1/4421 |
| | | | 414/462 |
| 2014/0157770 A1* | 6/2014 | Liao | B60T 17/222 |
| | | | 60/584 |
| 2014/0202778 A1* | 7/2014 | Barrett | B60S 9/215 |
| | | | 180/12 |
| 2016/0038240 A1* | 2/2016 | Guerrero | B66F 11/00 |
| | | | 254/133 R |
| 2018/0264901 A1* | 9/2018 | Downs | B60D 1/46 |
| 2019/0002259 A1* | 1/2019 | Nichols | H02K 7/063 |
| 2021/0292141 A1* | 9/2021 | Resendiz | B66F 3/44 |

* cited by examiner

MULTI-PURPOSE JACK APPARATUS AND METHOD OF USE

RELATED APPLICATIONS

This non-provisional patent application claims priority pursuant to 35 U.S.C. § 119(e) to and is entitled to the filing date of U.S. Provisional Patent Application Ser. No. 62/888,218 filed Aug. 16, 2019, and entitled "Multi-Purpose Electric Jack Apparatus and Method of Use." The contents of the aforementioned application are incorporated herein by reference.

BACKGROUND

The subject of this patent application relates generally to tools, and more particularly to a jack configured for multiple uses.

The following description includes information that may be useful in understanding the present invention. It is not an admission that any of the information provided herein is prior art or relevant to the presently claimed invention, or that any publication specifically or implicitly referenced is prior art.

Applicant(s) hereby incorporate herein by reference any and all patents and published patent applications cited or referred to in this application, to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

By way of background, a wide array of manual and power tools have been developed over the years to solve problems or enable work. Most such tools are effectively based on one or more of the known "simple machines" such as "levers" and "ramps" (or "inclined planes" or "wedges") in order to gain a mechanical advantage or force multiplication effect so as to do work that would otherwise not be possible or do so more effectively or efficiently. Screws, gears, pulleys, and other such force converters or multipliers have often been incorporated in such tools as well. When it comes to force multiplication in the context of lifting, or the application of force against an object so as to lift or move it, a variety of lifts or jacks have been proposed in the art for various purposes.

A "jack" is generally understood to be a mechanical device used to lift heavy loads or to apply great force. Jacks can take many forms, ranging from a "scissor jack" to a "house jack" to a "floor jack" to a "farm jack." Fundamentally, jacks work on the principle of force multiplication, most commonly based on a screw, hence the family of "screw jacks" in various forms and suited to particular contexts and thus designed and rated for different degrees of loading and lifting, based on which names such as "car jack" or "house jack" were derived, for example. Among the traditional screw jacks, they may be manually driven as by a lever bar, socket tool or driver, or the like, or electromechanically driven as by a motor. And of course motors can be powered through a variety of means, including electrical power (A/C or D/C). Such screw or mechanical jacks are often preferred as being stronger and/or more reliable than air or even hydraulic jacks.

Though a variety of screw jacks are known, and even those that are powered or motorized (or include a motor with or without additional gearing or drive train or transmission components) so as to selectively turn the jack's screw to apply a force against an object, relative to such traditional screw and scissor type jacks as might be used to lift a vehicle, what has still been needed and heretofore unavailable is such a jack that is relatively compact or low profile and light yet powerful, that is or may be battery-powered, that is simple and versatile in use and even storage, that allows for multiple, easily adjustable lift points or means, including in some contexts positive engagement with the vehicle to prevent unwanted jack movement or slipping, that adapts to the terrain on which it is used and has sufficient travel to accommodate variance in both vehicle and terrain, and/or that can even be repurposed for breaching and other functions. Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing a jack apparatus configured for versatile, efficient, and safe use in multiple operational modes. In at least one exemplary embodiment, the jack apparatus generally comprises a main jack body defined by telescopically engaged outer and inner tubes, a selectively positionable clamp assembly positioned along the jack body for selective engagement with the object to which a force is to be applied, and a drive assembly located on and within the jack body. In a further related aspect a retainer is configured for being mounted on the object to be moved or lifted and for positively engaging a receiver on the clamp assembly so as to effectively lock the jack to the object being lifted such as a vehicle for safe and effective operation.

Other objects, features, and advantages of aspects of the present invention will become more apparent from the following detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

Figure 1:
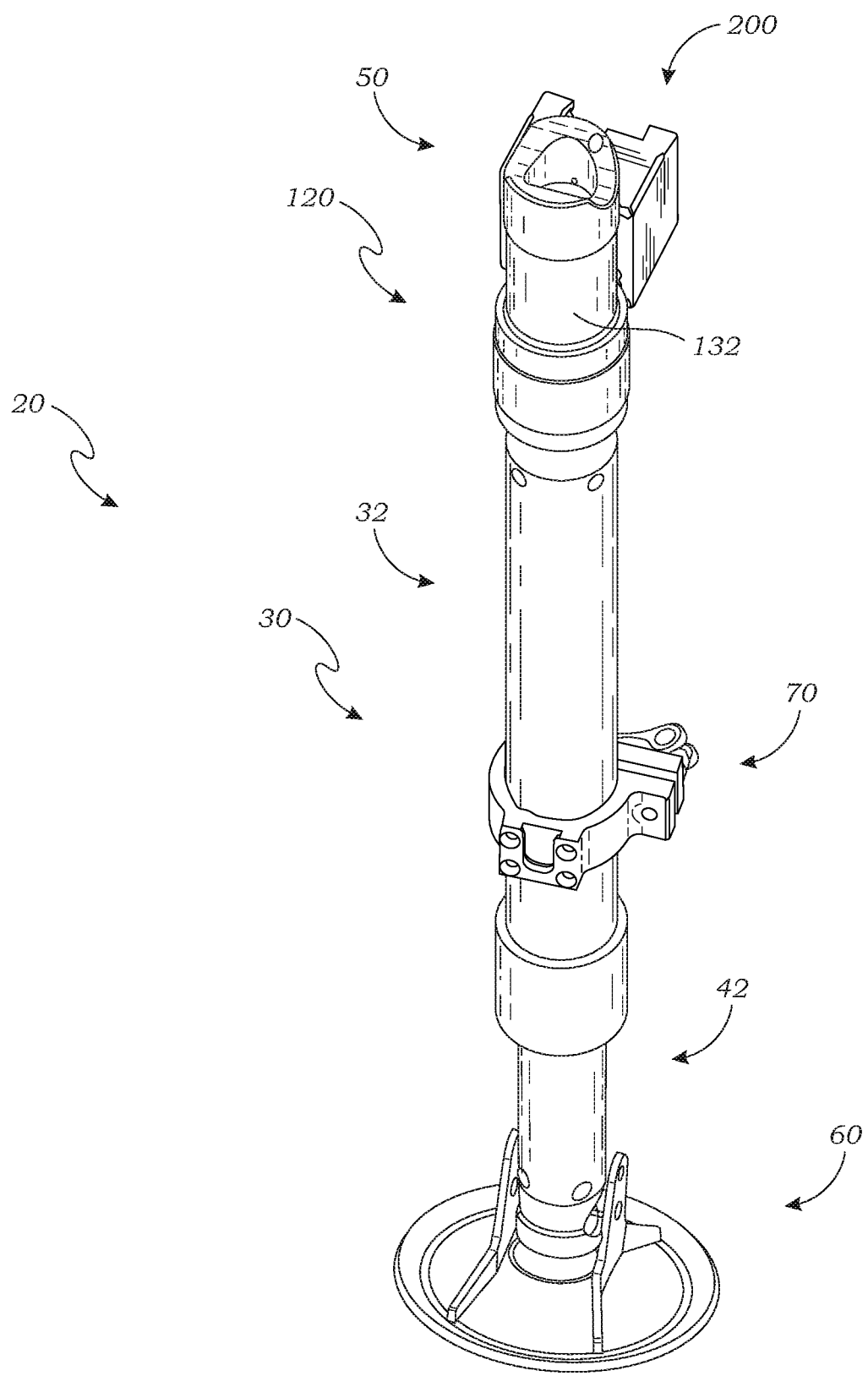
FIG. 1 is a perspective view of an exemplary jack apparatus, in accordance with at least one embodiment.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments. More generally, those skilled in the art will appreciate that the drawings are schematic in nature and are not to be taken literally or to scale in terms of material configurations, sizes, thicknesses, and other attributes of an apparatus according to aspects of the present invention and its components or features unless specifically set forth herein.

DETAILED DESCRIPTION

The following discussion provides many exemplary embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

While the inventive subject matter is susceptible of various modifications and alternative embodiments, certain illustrated embodiments thereof are shown in the drawings and will be described below in detail. It should be understood, however, that there is no intention to limit the invention to any specific form disclosed, but on the contrary, the inventive subject matter is to cover all modifications, alternative embodiments, and equivalents falling within the scope of any appended claims.

Turning now to FIG. 1, there is shown a perspective view of an exemplary embodiment of a multi-purpose jack apparatus 20 according to aspects of the present invention. The apparatus 20 comprises, in the exemplary embodiment, a main jack body 30 defined by telescopically engaged outer and inner tubes 32, 42, a top cap 50 positioned at the upper end of the jack body 30 and an opposite support foot 60 positioned at the lower end of the jack body 30, a selectively positionable clamp assembly 70 positioned along the jack body 30 for selective engagement with the object to which a force is to be applied, a drive assembly 120 located on and within the jack body 30, and a battery mount 200 interfacing with the drive assembly 120. More generally, it will be appreciated that the configurations of the various components and the overall jack apparatus 20 are merely illustrative of features and aspects of the present invention and non-limiting, and specifically that while an "electric jack" having an integral motor and power supply or battery mount, aspects of the present jack invention can also be practiced in a "manual jack" arrangement in which an external driver is employed in conjunction with the jack's drive assembly 120 in order to operate or raise and lower the jack during use, more about which is said below particularly in connection with FIGS. 10-12. Accordingly, the number, arrangement, geometry, material, and other aspects of the components and the overall jack apparatus 20 may vary or include or involve any configuration, material, or the like now known or later developed without departing from the spirit and scope of the present invention. By way of further illustration, while the outer tube 32 having a relatively larger outside diameter is shown as being positioned at the upper end of the jack body 30 closer to the top cap 50 and the inner tube 42 having a relatively smaller outside diameter is shown as being positioned at the lower end of the jack body 30 closer to the foot 60, such may be flipped so that the larger outer tube 32 is at the bottom and the smaller inner tube 42 is at the top, with other changes to related components and how they interface with the jack body 30 then incorporated as well, particularly as to the drive assembly 120. Relatedly, the points and means of connection or assembly of the various components, whether as snap- or press-fit or as secured via fasteners such as screws, etc., may all also vary and may involve any such fastening or attachment means, whether now known or later developed and whether permanent or temporary or removable. Thus, those skilled in the art will again appreciate that while a particular exemplary embodiment of a jack apparatus 20 according to aspects of the present is shown and described, the invention is not so limited but may instead take a variety of other forms, having more, less, or different parts, without departing from the spirit and scope of the invention. More generally, in forming the jack apparatus 20, including the components of the jack body 30 and any related tubes 32, 42, caps 34, 44, 50, housings 132, 142, 162, or other hardware or components, it will be appreciated that any appropriate materials and methods of construction now known or later developed may be employed, including but not limited to metals such as steel, aluminum, alloys, and the like and a variety of plastics such as carbon fiber, Delrin™, polypropylene, polystyrene, polyvinyl chloride ("PVC"), acrylonitrile butadiene styrene ("ABS"), polyethylenes such as high density polyethylene ("HDPE") and low density polyethylene ("LDPE"), polycarbonate, polyurethane, and other such plastics, thermoplastics, thermosetting polymers, and the like, any such components being fabricated or formed as through injection molding, casting, extrusion, machining, stamping, forming, or any other such technique now known or later developed. Relatedly, such components may be formed integrally or may be formed separately and then assembled in any appropriate secondary operation employing any assembly technique now known or later developed, including but not limited to fastening, bonding, welding, over-molding or coining, press-fitting, snapping, or any other such technique now known or later developed. Those skilled in the art will fundamentally appreciate that any such materials and methods of construction are encompassed within the scope of the invention, any exemplary materials and methods in connection with any and all embodiments thus being illustrative and non-limiting. Dimensionally, the overall size and scale or proportionality of any such jack apparatus 20 may again vary widely based on a number of factors and contexts—in the present exemplary telescoping-style jack, the overall diameter of the jack body 30 may range from roughly one to four inches (1-4 in.) or more and the adjustable length may be in the range of twelve to forty-eight inches (12-48 in.) or more, with an associated travel or movement of the jack apparatus 20 as dictated by the configuration thereof, though in the exemplary embodiment being on the order of six to twenty-four inches (6-24 in.), but again other sizes and shapes or configurations are possible according to aspects of the present invention.

Figure 2:
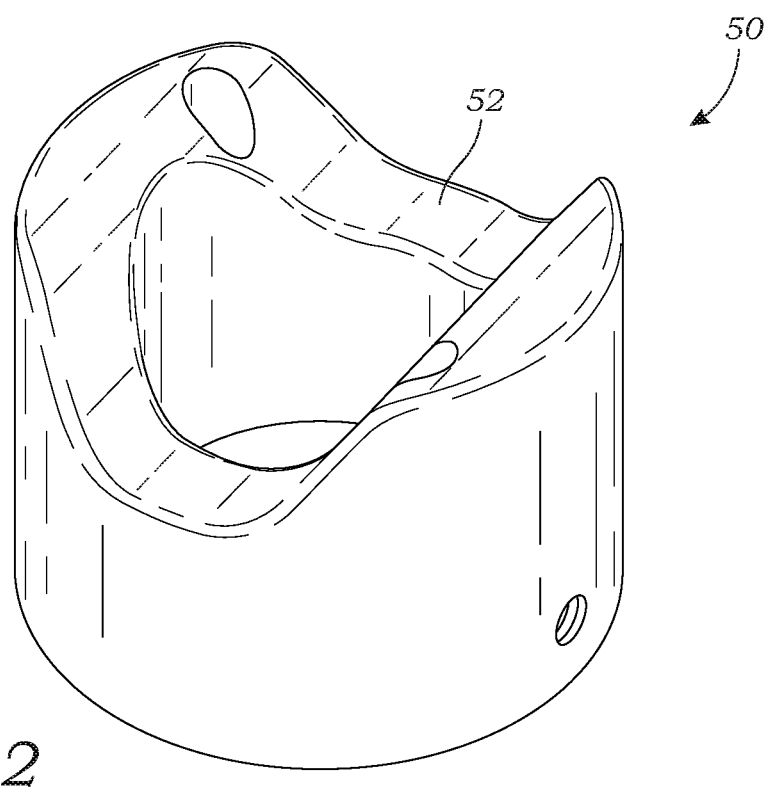
FIG. 2 is an enlarged perspective view of a top cap thereof, in accordance with at least one embodiment.

Referring next to FIG. 2, there is shown an enlarged perspective view of an exemplary top cap 50 according to aspects of the present invention as may be employed in conjunction with such a jack apparatus 20 as shown in FIG. 1. More specifically, such a top cap 50, as the name implies, would be positioned or installed at the top or upper end of the jack apparatus 50 for selectively engaging an object against which a force is to be exerted. In a bit more detail, per the illustrated embodiment, the top cap 50 is mounted on or over the motor housing 132 (FIGS. 10-12) at the proximal end of the jack apparatus 20 so as to enable transmission of force or load axially along the jack apparatus 20, and particularly through or along the telescoping jack body 30 comprised of the outer and inner tubes 32, 42 and down to the foot 60, more about which is said below in connection with FIGS. 3 and 4, that would be positioned in contact with a stationary object such as the ground during use, such that any actuation of the jack apparatus 20 as through its drive assembly 120 (FIGS. 10-12) so as to extend the jack body 30 would push against the relatively stationary foot 60 and thereby shift the top cap 50 accordingly, thereby shifting or lifting whatever the top cap 50 is engaged or in contact with, such as a vehicle. More particularly, it will be appreciated that the notch 52 formed in the proximal surface or end of the top cap 50 would facilitate engagement with an edge, bar, pipe, or other such member of a vehicle's frame, chassis, or suspension system, for example and thereby prevent slipping or relative movement between the top cap 50, and thus the jack apparatus 20, and the vehicle or other object being lifted. It will be further appreciated that the top cap 50 can take on a variety of other forms beyond that shown and described and, relatedly, may be mounted on the jack apparatus 20 or body 30 or any component thereof employing any appropriate means now known or later developed, including but not limited to press-fit or screw-type fasteners. Further, the top cap 50, as with all such components of the jack apparatus 20, may be formed of any suitable material and by any suitable manufacturing method now known or later developed; in the exemplary embodiment, the top cap 50 may be a machined 6061 T-6 aluminum, just as the outer and inner tubes 32, 42.

Figure 3:
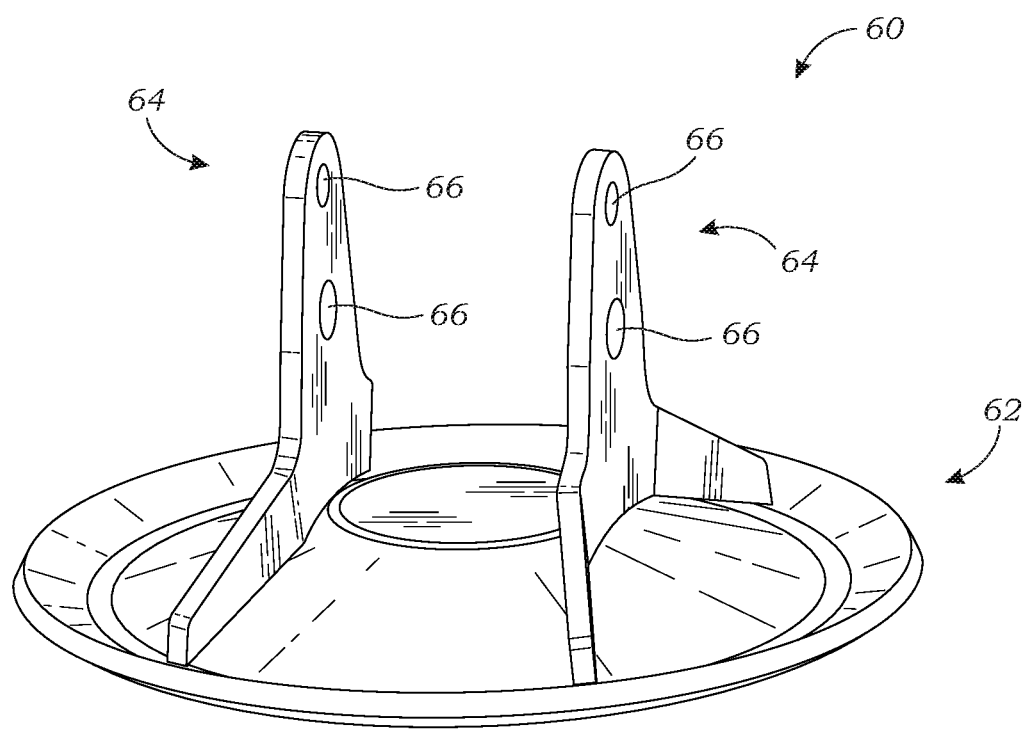
FIG. 3 is an enlarged top perspective view of a foot thereof, in accordance with at least one embodiment.
Figure 4:
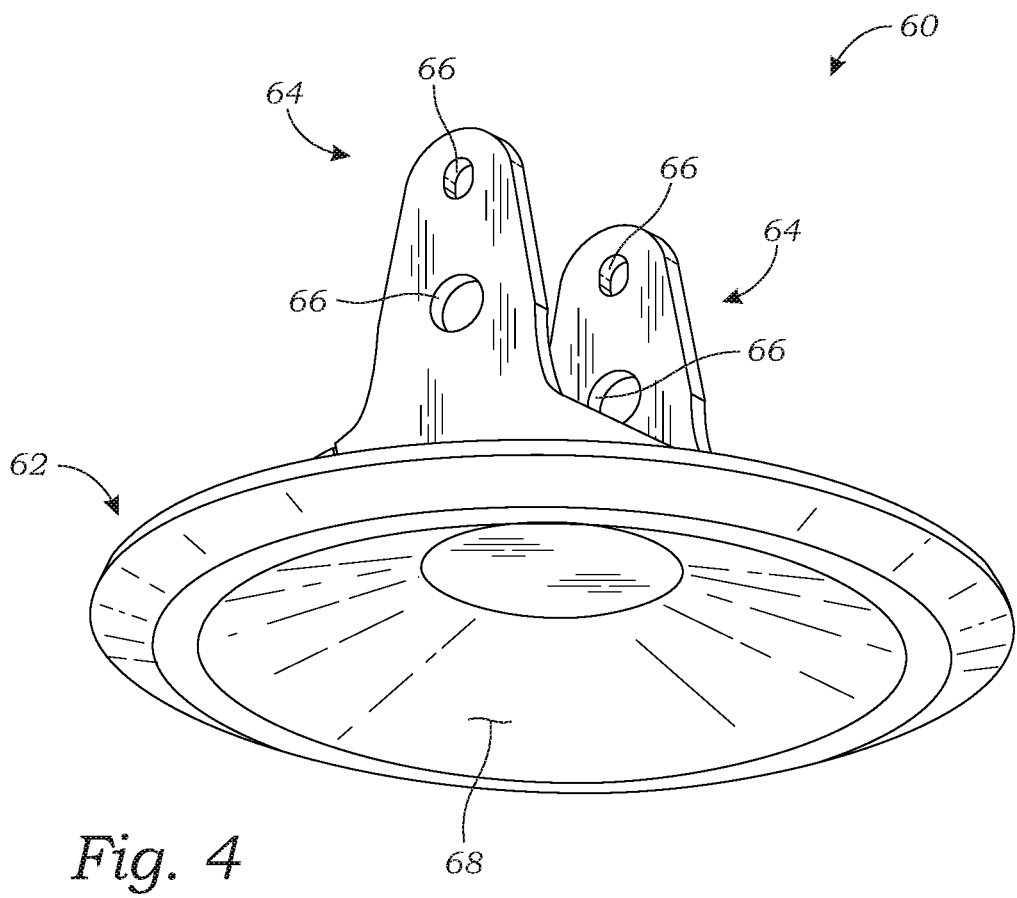
FIG. 4 is an enlarged bottom perspective view of the foot of FIG. 3, in accordance with at least one embodiment.

Referring briefly to FIGS. 3 and 4, there are shown enlarged perspective views of an exemplary foot 60 component according to aspects of the present invention as again may be employed in conjunction with a jack apparatus 20 such as shown in FIG. 1. Here, the foot 60 provides a structural base for the jack apparatus 20 as by being mounted or installed on the distal end of the jack body 30. Particularly, as shown, the foot 60 is formed as having a base 62 from which opposite mounting legs 64 extend somewhat proximally. The mounting legs 64 may be formed with one or more mounting holes 66 configured to accommodate a cross-bolt (not shown) or the like for then pivotally mounting the foot 60 on the foot support 46 formed at the distal end of the lower inner tube 42 as by passing such cross-bolt through both the leg mounting holes 66 and a corresponding cross-hole 47 (FIG. 10) formed in the foot support 46. Some such mounting features or holes 66 may be annular and some may not be or may even serve a purpose other than directly accommodating any such cross-bolt; indeed, in the exemplary embodiment, only the bottom set of round cross-holes 66 are for mounting the foot 60 on the foot support 46 of the jack's inner tube 42, while the top somewhat oval holes are for fixing the foot support 46 at a desired angular position relative to the inner tube 42 and thus the overall jack 20 during use, as by using additional cross-pins or the like. While the base 62 of the foot 60 is shown as being annular, that is not necessarily the case, but instead may take other geometries as desired to suit particular applications. Whatever the profile of the foot base 62, in at least an exemplary embodiment it is preferred that such base 62 be somewhat concave rather than flat or have a concave or recessed bottom surface 68, as best seen in FIG. 4, so as to create a region beneath the base 62 where loose dirt, sand, gravel, or other such surface material on which the jack apparatus 20 is operated may be trapped and thereby help prevent slippage, sinking, or other unwanted movement of the foot 60 and thus the jack apparatus 20 during use, or as the jack apparatus 20 is under load. The foot 60 may again be formed of any suitable material now known or later developed and through any appropriate manufacturing process, though in the exemplary embodiment the foot 60 is cast or machined from 5052 aluminum.

Figure 5:
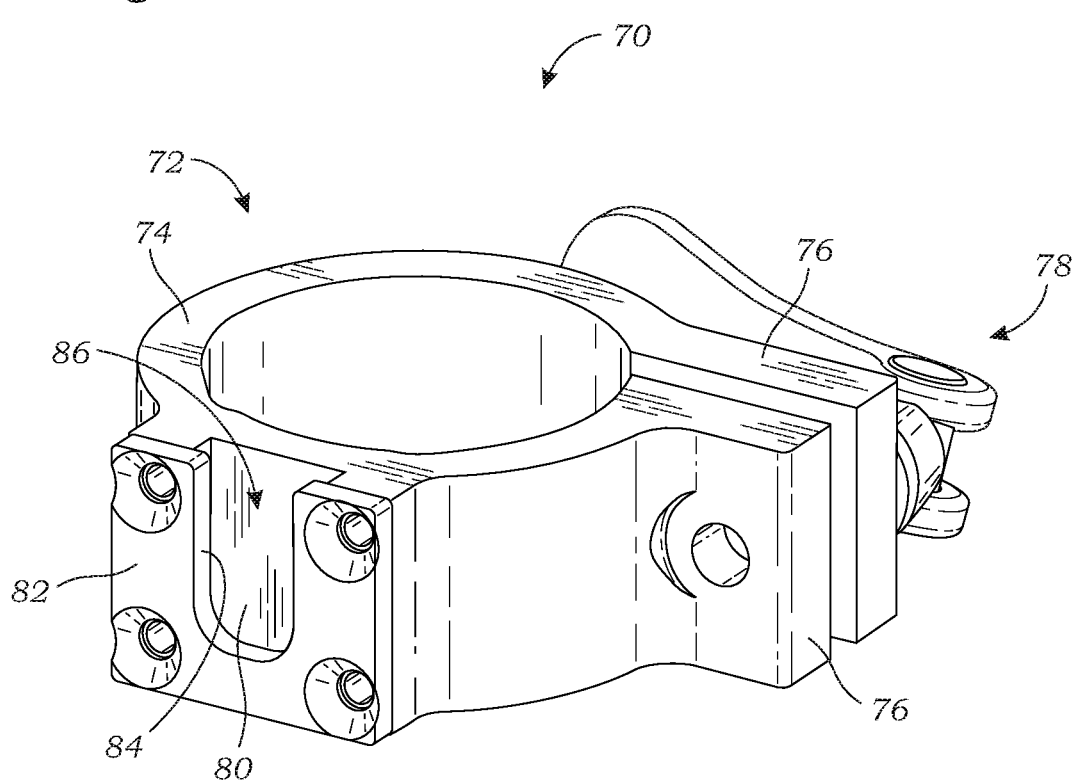
FIG. 5 is an enlarged perspective view of a clamp assembly thereof, in accordance with at least one embodiment.

Turning next to FIG. 5, there is shown an enlarged perspective view of the exemplary clamp assembly 70 according to aspects of the present invention as again may be employed in conjunction with a jack apparatus 20 such as shown in FIG. 1. Advantageously, such clamp assembly 70 allows for a height- and orientation-adjustable lift or engagement point for the jack apparatus 20. In the exemplary embodiment, the clamp assembly 70 is mounted so as to be selectively positionable along the upper outer tube 32 (FIG. 1) and comprises a clamp body 72 formed having an incomplete annular ring 74 with opposite clamp legs 76 extending substantially outwardly from the ring 74 at opposite ends of the ring 74, or at the break in the ring 74, such that by installing a threaded camming screw with handle 78 or the like in opposite holes formed in the clamp legs 76, such camming screw 78 may be selectively rotated and/or its associated handle pushed down or pulled up to tighten or loosen (or contract or expand) the annular ring 74 so as to thereby selectively position and then tighten or clamp the clamp assembly 70 at a desired location on or along a corresponding annular body, such as the outer tube 32 here in the jack body 30 exemplary embodiment, in a manner generally known and practiced in the art. Accordingly, it will be appreciated that the annular ring 74 of the clamp body 72 may be sized and configured to substantially correspond to the component on which the clamp assembly 70 is to operate; again, that here being the outer tube 32 having a nominal outside diameter (O.D.) of two and a half inches (2.5 in.), it will be appreciated that the nominal or at rest inside diameter (I.D.) of the annular ring 74 may also be approximately two and a half inches (2.5 in.), either or both being scalable up or down as desired. In use, to adjust the position of the clamp assembly 70 on the jack body 30, and the outer tube 32 specifically, a user need only pull up on the camming screw with handle 78, and then unscrew as needed, if at all, to loosen the clamp assembly 70 and allow it to be shifted axially along and/or rotated circumferentially about the outer tube 32; and once the clamp assembly 70 is in the desired position, the camming screw 78 is simply retightened as through rotation and/or pushing down on its handle to then lock the clamp assembly 70 in place. Uniquely, the clamp body 72 is further formed having on an outer wall thereof a clamp undercut 80. A clamp retaining plate 82 formed with a clamp retaining plate notch 84 is then mounted over the clamp undercut 80 so as to form a slotted pocket 86 with which other force application components having corresponding geometry might positively engage as through sliding into the pocket 86 at its open end. Those skilled in the art will appreciate that while the pocket 86 is shown and described as being formed from two separate components—the clamp body 72 and the clamp retaining plate 82—such feature can also be formed in a unitary clamp body 72 as through machining, casting, molding, or other such manufacturing technique employing related appropriate materials. In any event, it will again be appreciated that such pocket 86 formed in the clamp body 72 facilitates effectively a locking or keyed engagement with the jack apparatus 20.

Figure 6:
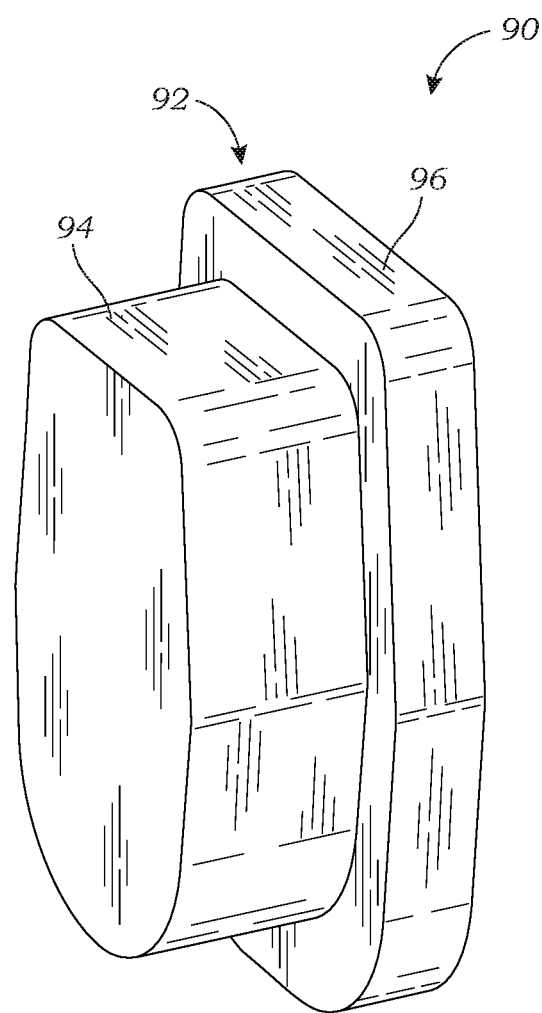
FIG. 6 is an enlarged rear perspective view of a retainer thereof, in accordance with at least one embodiment.
Figure 7:
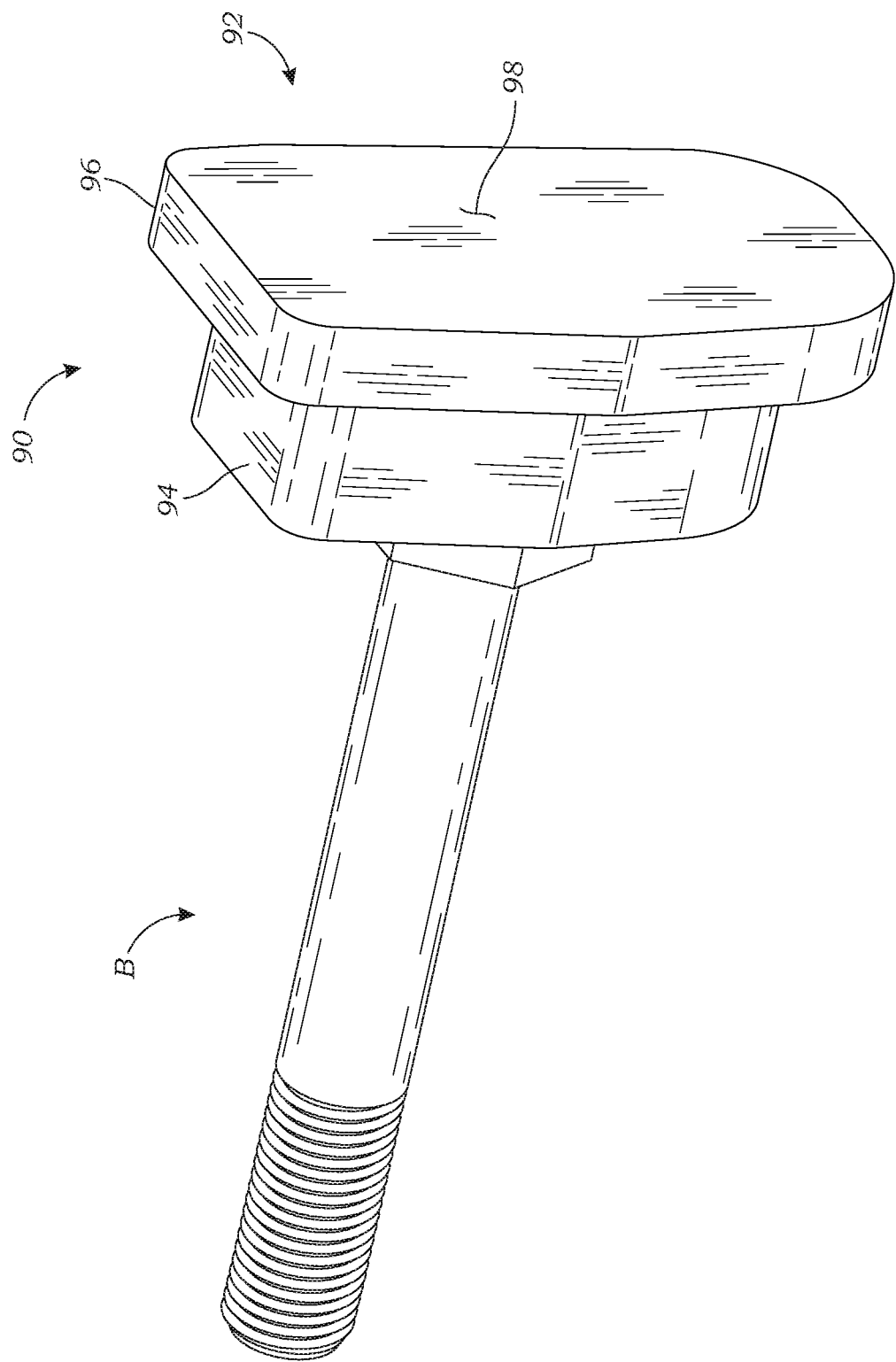
FIG. 7 is an enlarged front perspective view of the retainer of FIG. 6 now having a bolt installed thereon, in accordance with at least one embodiment.
Figure 19A:
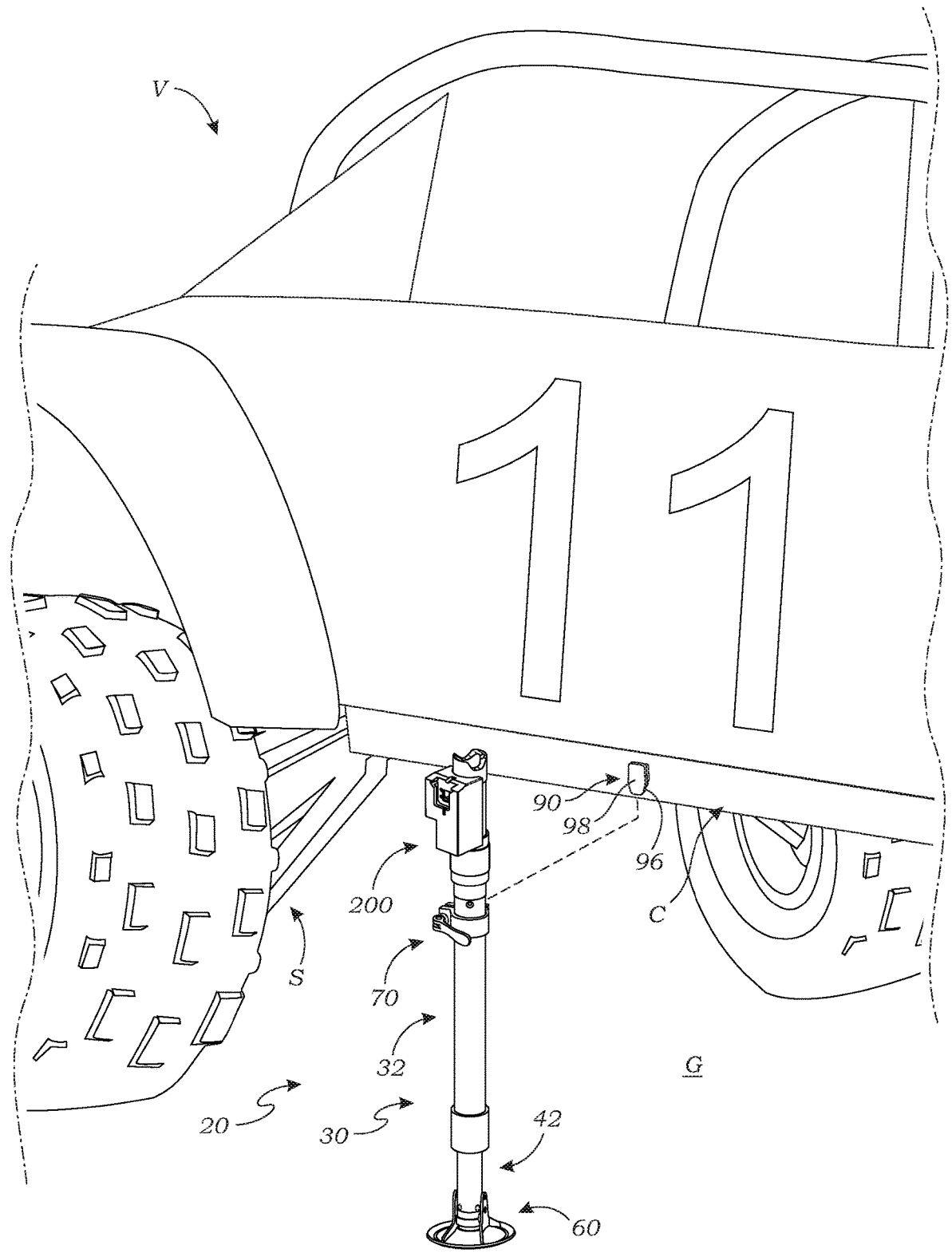
FIGS. 19A and 19B are perspective views of the exemplary jack apparatus of FIG. 1 in use, in accordance with at least one embodiment.
Figure 19B:
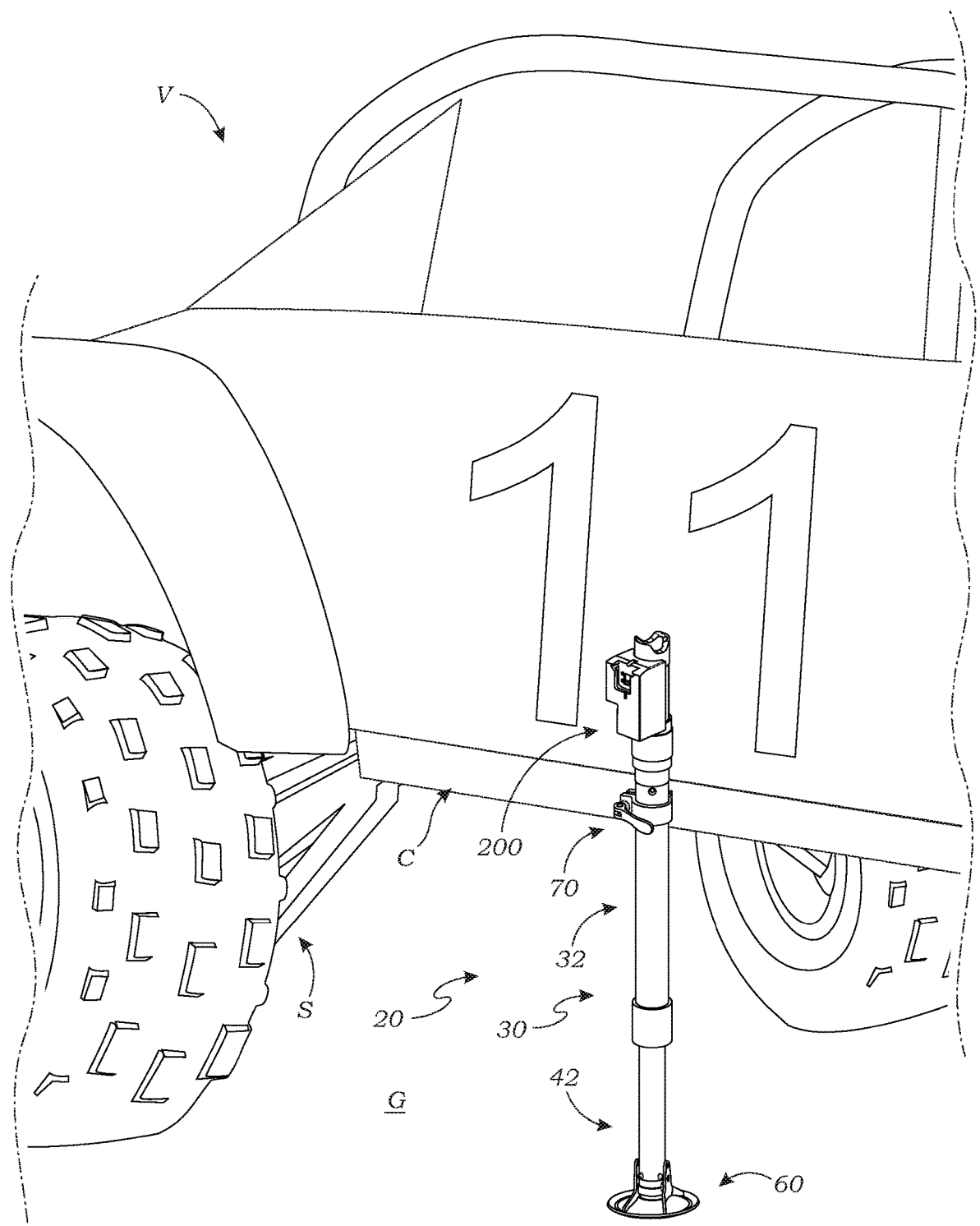

Relatedly, referring to FIGS. 6 and 7, there are shown enlarged perspective views of an exemplary retainer 90 as might selectively engage the pocket 86 of the adjustable clamp assembly 70 of FIGS. 1 and 5, the retainer 90 thus being one example of a force application component as employed with the clamp assembly 70 of a jack apparatus 20 according to aspects of the present invention. The illustrated retainer 90 is shown as having a retainer body 92 with a retainer post 94 protruding laterally therefrom, the post 94 having a relatively smaller profile than the retainer body 92 and so defining along an edge of the retainer body 92 a relatively larger outwardly-extending flange 96 about at least a portion of the perimeter of the body 92, as depending on the size and location of the retainer post 94 relative to the retainer body 92. As seen in FIG. 7, the front side of the retainer body 92, or the side opposite the illustrated retainer post 94, defines a retainer surface 98 that would be against or toward the undercut 80 or back of the pocket 86 when the retainer 90 is engaged with the pocket 86. The retainer body 92 is ultimately sized and configured so as to allow selective receipt of the retainer 90 within the pocket 86 of the clamp assembly 70; specifically, the retainer body 92, or the flange 96 thereof in the case of an undersized retainer post 94 being included in the retainer 90, may be configured to seat within the pocket 86, again with the front retainer surface 98 toward the clamp body 72, and to be retained laterally, here by the undercut 80 and the retaining plate 82, with the notch 84 formed in the retaining plate 82 allowing for the retainer post 94 to extend therethrough. Those skilled in the art will appreciate that with or without the retainer post 94, the retainer 90 and specifically the retainer body 92 can be retained within the pocket 86 of the clamp assembly 70 geometrically due to the profile or perimeter of the retainer body 92 or any related flange 96 formed thereon or defined thereby, with the retainer body 92 being accessible laterally even when so installed in the pocket 86 as through the notch 84 formed in the retaining plate 82. With reference to FIG. 7, those skilled in the art will also then appreciate that with or without the retainer post 94 not only can the retainer 90 be seated within the clamp pocket 86 but further components such as a bolt B, pins, posts, plates, screws, and the like can be affixed to the retainer body 92, or its post 94 if there is one, as through welding, threads, or other mechanical attachment means, so as to facilitate attachment of the retainer 90 ultimately to a structure that is to be lifted and thus with which the jack apparatus 20 is to operably engage, such as again the frame or chassis C or a suspension component S in the case of a vehicle V (FIGS. 19A and 19B). Indeed, in an alternative approach, the exemplary retainer 90 can be welded directly to such vehicle structure with its front retainer surface 98 facing out and so effectively permanently installed on the vehicle for use with the jack apparatus 20 as needed. Such retainers 90 may be formed of any appropriate material and through any related manufacturing method now known or later developed and again in a variety of geometries beyond that shown and described, which is to be understood as merely illustrative of features and aspects of the present invention and not limiting. Fundamentally, aspects of the present jack apparatus 20 invention relate to features that may be installed or mounted on an object that is to be lifted that facilitate positive engagement of a jack with such features and thus with the object, thereby improving the safety and efficacy of the jack and its operation. Once more, those skilled in the art will appreciate that such retainer 90 in concert with the adjustable clamp assembly 70 adds tremendous flexibility and versatility of the jack apparatus 20 in use, allowing for a wide range of engagement locations or points to suit particular contexts as desired, all as options to the top cap 50 of FIGS. 1 and 2.

Figure 8:
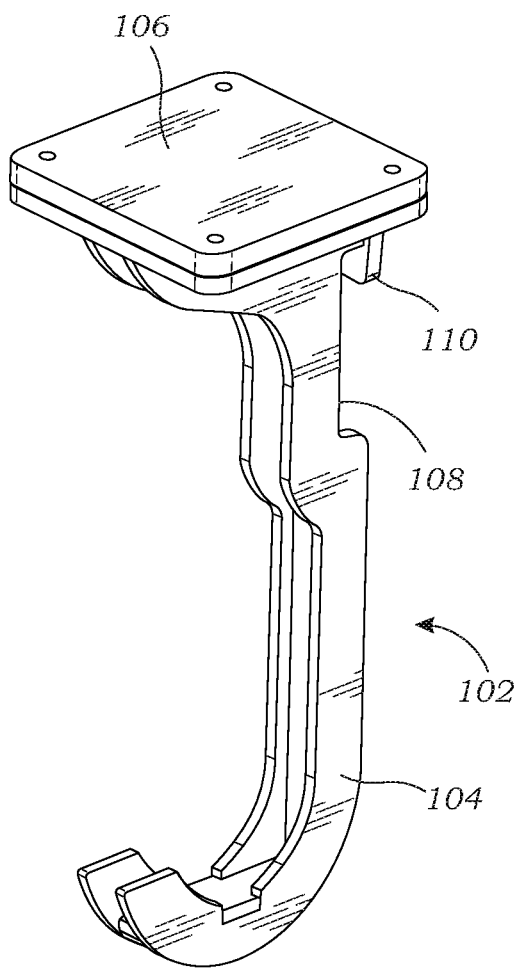
FIG. 8 is an enlarged front perspective view of a hook thereof, in accordance with at least one embodiment.
Figure 9:
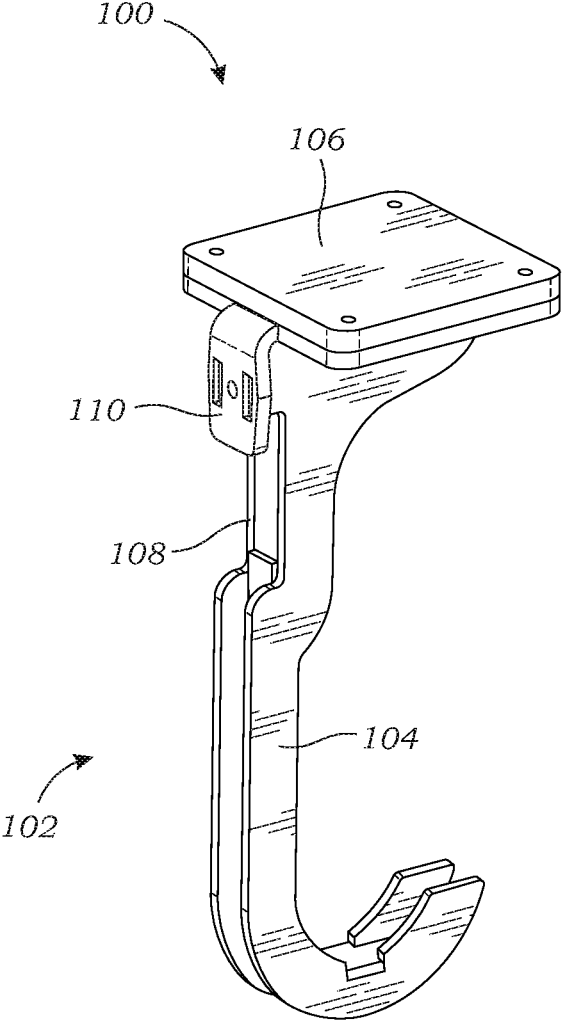
FIG. 9 is an enlarged rear perspective view of the hook of FIG. 8, in accordance with at least one embodiment.

Turning briefly to FIGS. 8 and 9, there are shown enlarged perspective views of an alternative exemplary retainer or force application component configuration, here in the form of an exemplary hook 100 as might be employed to push up on or hook underneath a structural feature of an object to be lifted or moved, the hook-type retainer 100 again selectively engaging the pocket 86 of the adjustable clamp assembly 70 of FIGS. 1 and 5 just as the basic retainer 90 of FIGS. 6 and 7 and so again having versatility in the height and orientation of the hook 100 and thus the location at which the jack apparatus 20 operably engages the object, the hook 100 thus being another example of a force application component as employed with the clamp assembly 70 of a jack apparatus 20 according to aspects of the present invention. The illustrated hook 100 is shown as generally having a hook body 102 formed having one or more hook legs 104 formed in a curved or somewhat "L"- or partial "U"-shaped configuration or profile, again to facilitate hooking under an object or structure to be moved or lifted. Opposite the curved hook legs 104 there is formed a hook pad 106 or support surface that can essentially engage or contact most any other surface and thereby transmit a force from the jack apparatus 20 to the object or otherwise serve to move or lift the object through such alternative mechanical engagement between the object and the jack apparatus 20 via the hook pad 106. Notably, with particular reference to FIG. 9, along the hook body 102 between the hook legs 104 and the hook pad 106, and on an edge or surface of the hook body 102 somewhat opposite the direction or orientation of one or both of the hook legs 104 and hook pad 106, there is formed a hook undercut 108 that is at least partially bounded by a hook retaining plate 110, the retaining plate 110 thus extending over at least a portion of the hook undercut 108 and so being suspended offset from the remaining structure of the hook body 102 and thereby configured to selectively engage the pocket 86 of the adjustable clamp assembly 70 of FIGS. 1 and 5 in somewhat the same way as the retainer body 92 or flange 96 of the basic retainer 90 is capable of as described above in connection with FIGS. 6 and 7. As such, it will be appreciated that the hook 100 is positively engaged with the clamp assembly 70 and thus the jack apparatus 20, thereby enabling the hook 100 to be employed in connection with lifting or moving a particular object as appropriate, with the versatility of the hook 100 as having both the curved hook legs 104 and the hook pad 106 further enhanced again by coupling it to the axially- and rotationally-adjustable clamp body 70 as herein described. As with the general retainers 90 and other components of a jack apparatus 20 according to aspects of the present invention, the hook 100 may be formed of any appropriate material and through any related manufacturing method now known or later developed and again in a variety of geometries beyond that shown and described, which is to be understood as merely illustrative of features and aspects of the present invention and again not limiting. By way of further illustration of use such a jack apparatus 20, the hook 100, alone or in combination with the top cap 50 for initial extensive lifting or tipping, can even be employed in recovery of a vehicle, or rolling a vehicle back onto its wheels if it has flipped.

Figure 10:
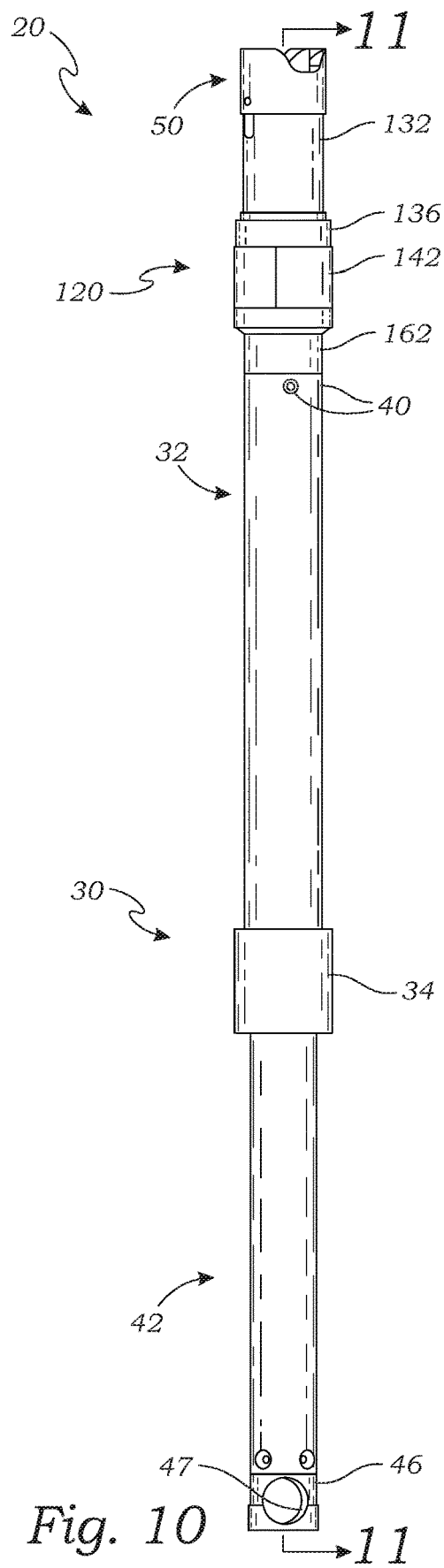
FIG. 10 is a side view of the exemplary jack apparatus of FIG. 1, in accordance with at least one embodiment.
Figure 11:
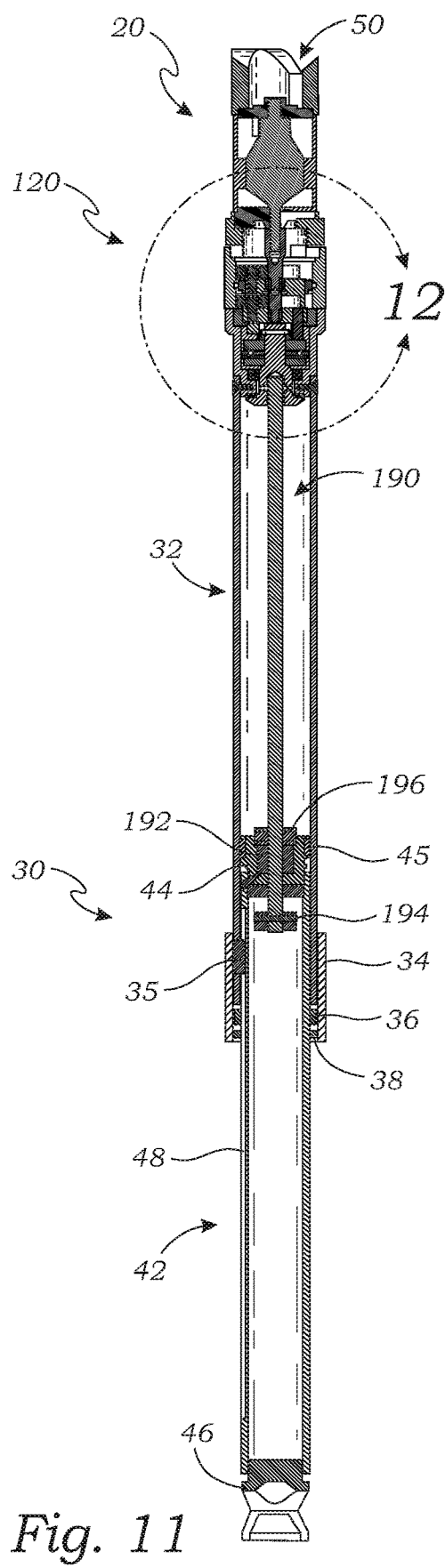
FIG. 11 is a cross-sectional view thereof as taken from line "11-11" of FIG. 10, in accordance with at least one embodiment.
Figure 12:
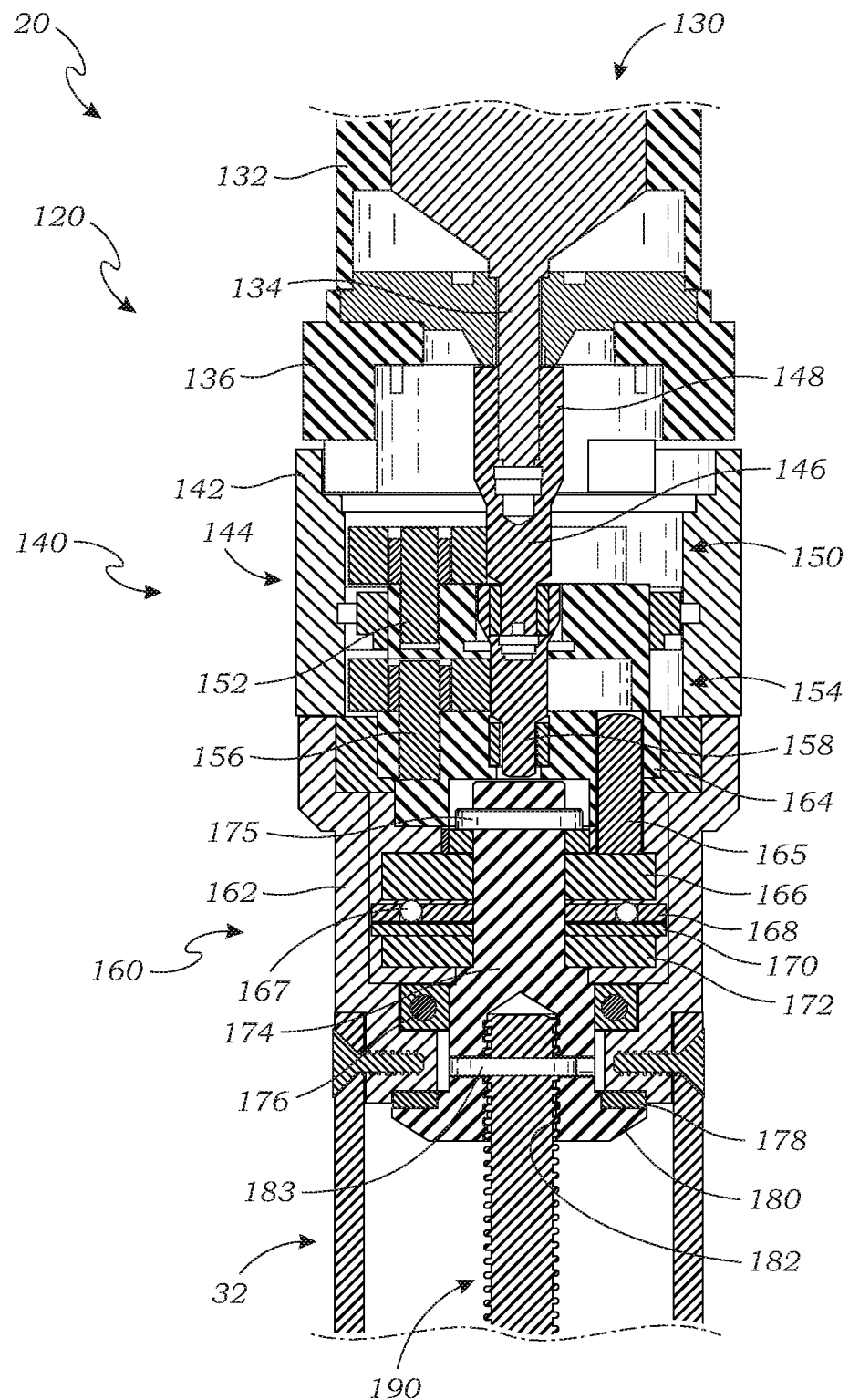
FIG. 12 is an enlarged partial cross-sectional view thereof as taken from circle "12" of FIG. 11, in accordance with at least one embodiment.

Referring next to FIGS. 10-12, there are shown a side view (FIG. 10), a cross-sectional view (FIG. 11, taken from line "11-11" in FIG. 10), and an enlarged partial cross-sectional view (FIG. 12, taken from circle "12" of FIG. 11) so as to particularly show the drive assembly 120 and its various internal components as well as other internal features of the outer tube 32 and inner tube 42 forming the jack body 30. In such views, the foot 60, clamp assembly 70, and battery mount 200 are removed for simplicity relative to FIG. 1. First, as best seen in FIG. 11, the outer and inner tubes 32, 42 are shown as being hollow, again so that the inner tube 42 is telescopically received within the outer tube 32 and also so that the overall jack body 30 can operably contain the drive assembly 120, which generally comprises an electric motor 130, a gear assembly 140, a clutch assembly 160, and a lengthwise or axial leadscrew 190, more about which is said below. Both the outer and inner tubes 32, 42 generally comprise hollow annular tubes or bodies with opposite open ends that are enclosed by installed components integral to the overall jack apparatus 20, in the exemplary embodiment formed from 6061 T-6 aluminum. In the exemplary embodiment, the outer tube 32 is nominally nineteen and one-quarter inches (19.25 in.) long with an outside diameter (O.D.) of two and a half inches (2.5 in.) and a wall thickness of about one-quarter inch (0.25 in.), and the smaller inner tube 32 is nominally eighteen and three-quarter inches (18.75 in.) long with an outside diameter (O.D.) of about two inches (2.0 in.) and a wall thickness again of about one-quarter inch (0.25 in.), though once more it will be appreciated that all such dimensions are merely illustrative and non-limiting. The smaller telescoping inner tube 42 is formed at its distal end having a foot support 46 to which the foot 60 is selectively pivotally mounted and at its proximal end having an upper cap 44 configured to accommodate a drive nut 192 that is threadably engaged with the leadscrew 190, as explained further below. To prevent the lower inner tube 42 from rotating relative to the upper outer tube 32 upon their telescoping engagement and actuation or rotation of the leadscrew 190, a lengthwise channel 48 is formed along the outside surface of the inner tube 42 that is engaged by an inner tube key 35 formed within or retained by a lower cap 34 installed on the distal end of the outer tube 32. The lower cap 34 may further comprise an annular outer tube wear ring 36 and an offset annular wiper 38 seated within undercuts in the lower cap 34 and oriented toward the telescoping inner tube 42 so as to effectively frictionally engage or seal against its outer surface as the outer and inner tubes 32, 42 shift axially relative to one another during operation of the jack apparatus 20, thereby facilitating such relative axial movement while keeping the interior space bounded by the outer and inner tubes 32, 42 relatively free of dirt and debris that could adversely affect operation of the jack apparatus 20. Similarly, an inner tube wear ring 45 may be provided within an undercut formed in the outside surface of the upper cap 44 to again facilitate relatively smooth or frictionless movement of the inner tube 42 relative to the outer tube 32. Such wear rings 36, 45 and wiper 38 may be formed of any appropriate configuration and material now known or later developed. Finally, at the upper end of the outer tube 32 fasteners 40 may be employed in installing the drive assembly 120, and the clutch assembly housing 162 more specifically, onto the proximal end of the outer tube 32, more about which is said below; in the exemplary embodiment, such fasteners 40 are ⅝" long ¼"-20 threaded alloy steel flat head socket cap screws.

With continued reference to FIGS. 10-12, and particularly the enlarged partial cross-sectional view of FIG. 12 showing most of the drive assembly 120 of the exemplary jack apparatus 20, it can again be seen that such drive assembly 120 generally comprises an electric motor 130, of course only in the case of an "electric jack" setup, a gear assembly 140, a clutch assembly 160, and a leadscrew 190. The electric motor 130 may be any appropriate motor now known or later developed rated for sufficient torque and operation for a particular application of an electric jack 20 according to aspects of the present invention and so can take many forms and specs, and as shown the motor 130 is contained within a motor housing 132. In one exemplary embodiment the motor 130 is a brushless DC motor rated at ten thousand hours (10,000 hrs.) of normal use and having an axial rotatable drive shaft 134. A motor mount 136 is positioned between the electric motor 130, and its motor housing 132, and the gear assembly 140 to facilitate operable installation of the motor 130 within the overall drive assembly 120, and relative to the gear assembly 140 specifically. Alternatively, rather than an electric motor 130 and related housing 132, the drive shaft 134 may instead simply extend axially out of the top end of the jack 20, as by extending up through the motor mount 136, and terminate in a nut or lug that may be engaged by an external drill or driver, such as an impact gun or ratchet, or the like so as to effectively employ an external power source to then drive the drive assembly 120 or the leadscrew 190 directly and thus operate the jack 20 in a "manual jack" setup (where the leadscrew 190 is driven directly in such a "manual" arrangement, there would thus be no need for the drive assembly 120 or even the drive shaft 134, the leadscrew 190 instead extending out of the upper end of the jack 20 and an appropriate lug point installed on the proximal, exposed end of the leadscrew 190 in such an optional "direct drive" arrangement). Those skilled in the art will thus appreciate that aspects of the present invention may be practiced in "electric" and "manual" configurations without departing from its spirit and scope, including a variety of mechanical and electro-mechanical arrangements beyond those shown and described, which are to be understood as illustrative and non-limiting. The gear assembly 140 may include a gear assembly housing 142 within which is operably contained a planetary gear set assembly 144, itself comprising in the exemplary embodiment an eight-tooth central gear 146 with related central gear shaft 148 that is coupled to the motor drive shaft 134, the central gear 146 engaging one or more individual planetary gear sets 150, 154 operably installed in series, with each gear of such sets 150, 154 rotating on a respective planetary gear shaft 152, 156. The last or lowest planetary gear set 154 in series drives a gear set subshaft 158 that is coupled to a main shaft coupler 164 that is part of the clutch assembly 160. Contained then within the clutch assembly housing 162 that is installed in series between the gear assembly 140, or the gear assembly housing 142, and the proximal end of the outer tube 32 is a somewhat stacked series of one or more, individually and collectively, of a clutch drive flange 166, a clutch drive plate 168, a clutch pressure plate 170, and a conical spring washer 172, which cooperate to selectively apply friction to a proximally-facing shoulder of the main shaft 174 that is operably engaged with the gear set subshaft 158 via the main shaft coupler 164 so as to assist in speed and torque regulation. In a manner known in the art, clutch bearings 167 are operably installed between the clutch drive flange 166 and the clutch drive plate 168 and a dowel pin 165 is seated in the main shaft coupler 164 and selectively positively engages the clutch drive flange 166. An assortment of other bushings, bearings, arbors, dowels and pins, guide plates, retaining pins and rings, and other such fastening, coupling, retaining, wear reducing, and related functional components, whether now known or later developed and whether in various configurations, combinations, or locations and in greater or fewer numbers, may be employed in an electrical jack apparatus 20 and specifically a drive assembly 120 thereof according to aspects of the present invention without departing from its spirit and scope, such that the noted components of the drive assembly 120 are to be understood as illustrative and non-limiting. By way of further illustration and not limitation, the main shaft 174 is shown as being coupled proximally to the main shaft coupler 164 via an upper cross-pin 175, while distally the body of the main shaft 174 is supported relatively frictionlessly through a main shaft thrust bearing 176 that effectively carries or transfers the forces or load from the rotating main shaft 174 through to the stationary clutch assembly housing 162, though again other means of engagement of these and all such components so assembled and operational now known or later developed may be employed.

Continuing with the drive assembly 120 and now with reference to FIGS. 11 and 12, distally and continuing in series through the assembly 120, at the distal end of the main shaft 174 there is formed a radially-outwardly extending flange 180 configured to seat against the distally-facing end or surface of the clutch housing 162 and trap within an undercut formed therein a main shaft wiper 178 for contacting or wiping or sealing against an outer wall of the main shaft 174 to prevent dirt or debris from traveling therealong and particularly from getting into the thrust bearing 176. In the distal end of the main shaft 174 and somewhat centered therein relative to the main shaft flange 180 is a distally-opening main shaft bore 182 within which is operably received the proximal end of the leadscrew 190. A lower cross-pin 183 may be employed in thereby coupling the leadscrew 190 to the main shaft 174 within the main shaft bore 182, though once more, other means of engagement now known or later developed may be employed instead. At the distal end of the leadscrew 190, or the end opposite the balance of the drive assembly 120 at the upper end of the outer tube 32, the leadscrew 190 passes through the upper cap 44 of the inner tube 42 as by engaging the drive nut 192 seated within the upper cap 44. It will thus be appreciated that rotation of the leadscrew 190 via the other components of the drive assembly 120, namely, the electric motor 130, gear assembly 140, and clutch assembly 160, serves to lower or raise the inner tube 42 telescopically within or relative to the outer tube 32 or thereby extend or retract the overall jack body 30 and thus selectively apply a force via the jack apparatus 20 against an object or load as described herein. Once more, rotation of the inner tube 42 relative to the outer tube 32 as the leadscrew 190 rotates is prevented due to the inner tube key 35 that is incorporated effectively within the outer tube 32 engaging the lengthwise channel 48 along the inner tube 32, thereby keying the outer and inner tubes 32, 42 and allowing only their axial movement relative to each other whiles substantially preventing rotational movement relative to each other. Again, other means of operably engaging, and keying, and then selectively shifting one tube relative to the other, whether now known or later developed, may be employed in a jack apparatus 20 according to aspects of the present invention beyond the illustrative embodiment without departing from its spirit and scope. Distally beyond the drive nut 192 and the upper cap 44 itself, the leadscrew 190 further engages a stop nut 194 essentially to mechanically prevent the leadscrew 190 from ever backing completely out of the drive nut 192, or the jack apparatus 20, and specifically the jack body 30, from being overextended. Proximally, above but relatively adjacent to the upper cap 44, a leadscrew thrust bearing 196 is positioned about the leadscrew 190 for further support thereof and to space the upper cap 44 from the main shaft 174 of the drive assembly 120 when the jack apparatus 20 is fully retracted; otherwise, the inner tube upper cap 44 could contact or seat against the main shaft 174 and potentially bind, making it more difficult for the motor 130 to generate sufficient torque to separate or unseat the two components as when the jack apparatus 20 is to be extended from a fully collapsed or retracted position during use. As such, the leadscrew thrust bearing 196 effectively reduces the breakaway torque required to separate the adjacent components and actuate the jack apparatus 20, though again those skilled in the art will appreciate that a variety of other such components, now known or later developed, could be employed or the design otherwise modified to prevent frictional or unwanted contact between the main shaft 174 and essentially other components within the system. In the exemplary embodiment, the leadscrew 190 may be formed of 1018 steel having a multi-start thread, such as a dual- or two-start thread comprising two intertwined threads running parallel to one another for a relatively high load or torque capacity, fine pitch thread even on a relatively larger diameter screw, which here in the illustrated embodiment may be a ½"-6 acme thread screw. Once more, those skilled in the art will recognize that other leadscrew configurations are possible according to aspects of the present invention, such that the exemplary specifications for the leadscrew 190 are to be understood as illustrative and non-limiting. By way of further illustration and not limitation, in such an exemplary jack apparatus 20 as shown and described herein having outer and inner tubes 32, 42 of the size, shape, and material indicated and the resulting jack body 30 being actuated accordingly as by a drive mechanism 120 operably engaged therewith, such a jack apparatus 20 may then have a nominal travel of about sixteen inches (16 in.) and a load capacity of about two thousand pounds (2,000 lbs.), though again it will be appreciated by those skilled in the art that the configuration of such a jack apparatus 20 may be modified in one or more respects or simply scaled up or down to achieve varying performance without departing from the spirit and scope of the invention.

Figure 13:
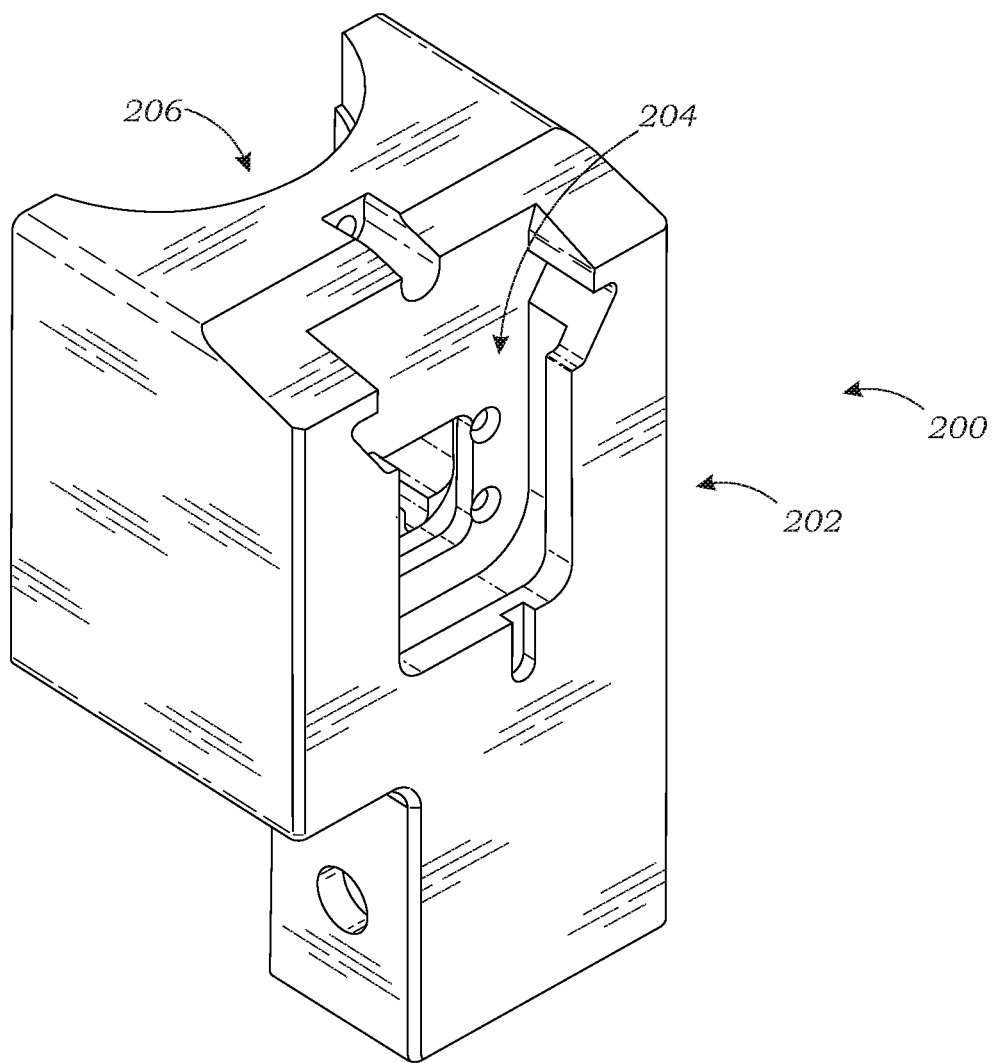
FIG. 13 is an enlarged perspective view of a battery mount thereof, in accordance with at least one embodiment.
Figure 14:
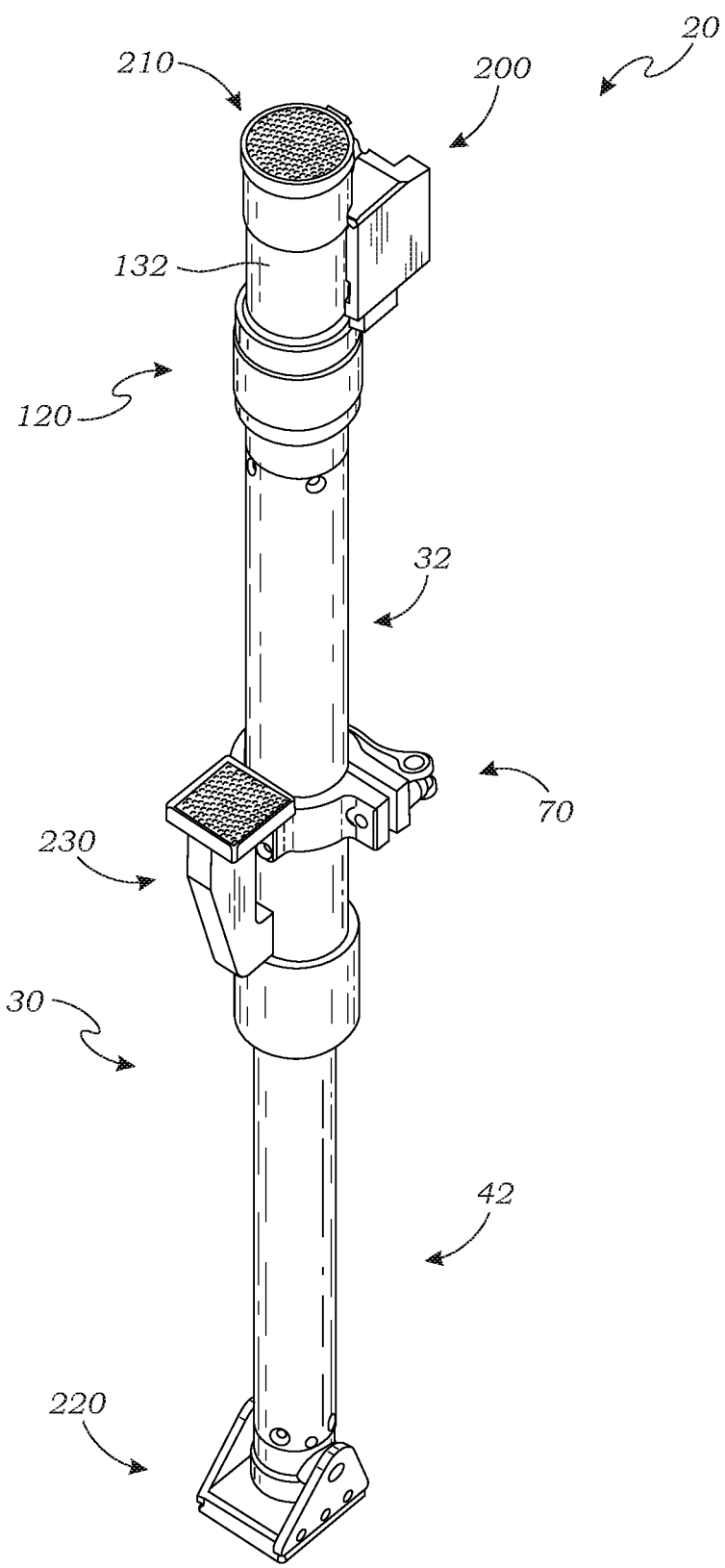
FIG. 14 is a perspective view of an alternative exemplary jack apparatus, in accordance with at least one embodiment.
Figure 15:
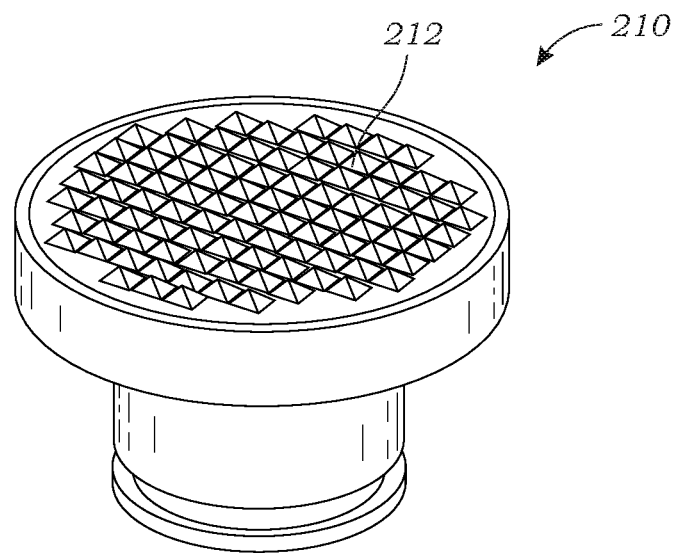
FIG. 15 is an enlarged perspective view of a breaching top foot thereof, in accordance with at least one embodiment.
Figure 16:
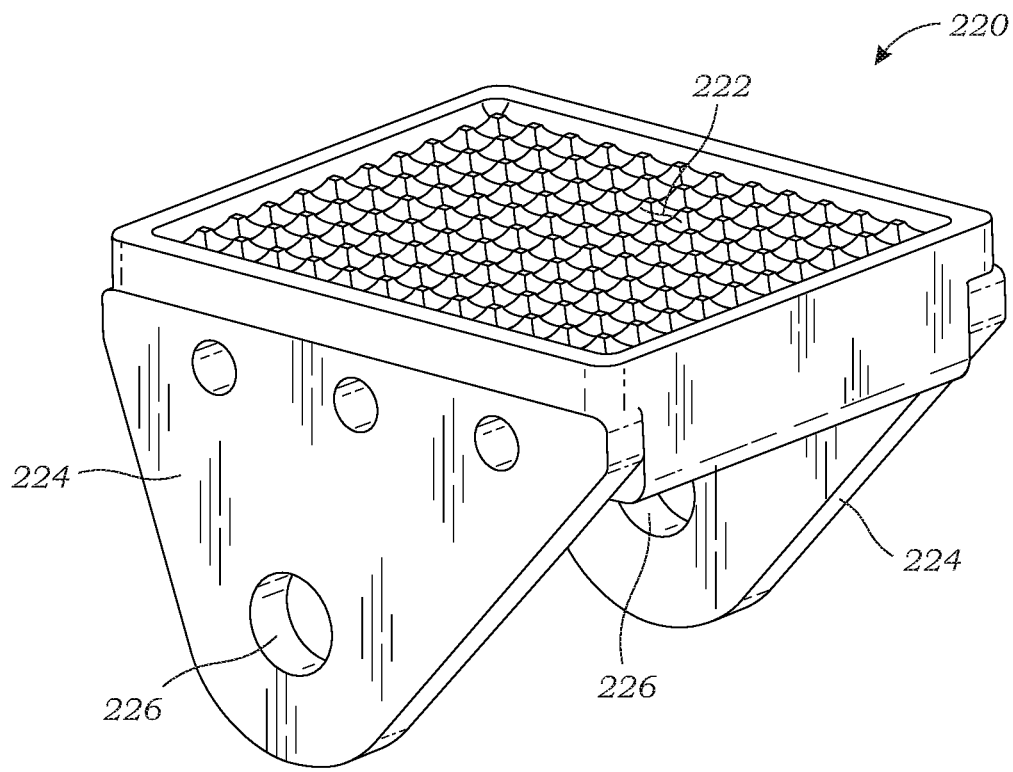
FIG. 16 is an enlarged perspective view of a breaching bottom foot thereof, in accordance with at least one embodiment.
Figure 17:
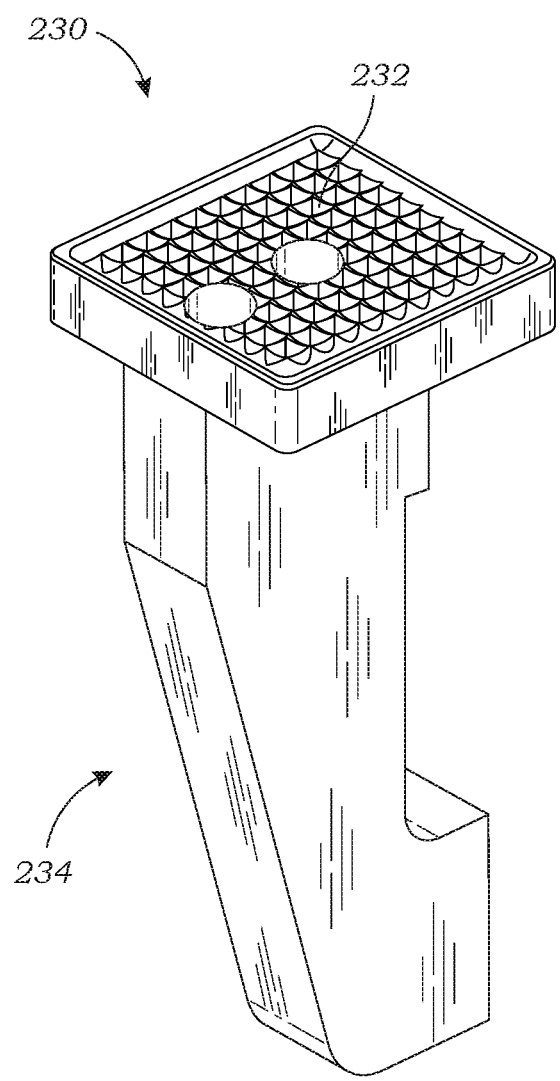
FIG. 17 is an enlarged perspective view of a breaching clamp foot thereof, in accordance with at least one embodiment.
Figure 18:
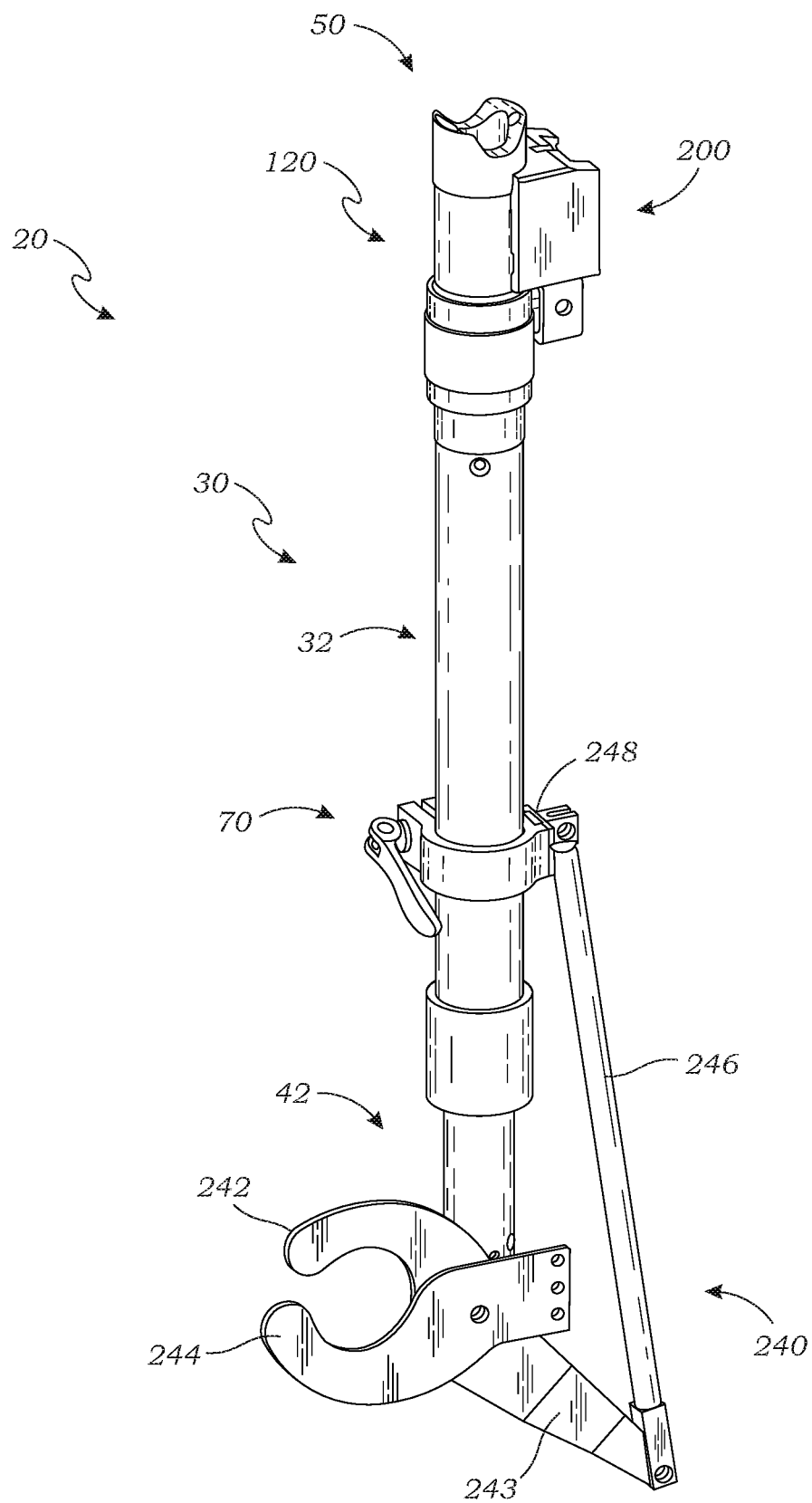
FIG. 18 is a perspective view of a further alternative exemplary jack apparatus, in accordance with at least one embodiment.

Turning briefly to FIG. 13, there is shown an enlarged perspective view of an exemplary battery mount 200 according to aspects of the present invention as again may be employed in conjunction with a jack apparatus 20 such as shown in FIGS. 1 and 10-12. The battery mount 200 essentially comprises a battery mount housing 202 formed therein with a receptacle 204 for selective removable receipt of a battery unit (not shown) and an opposite curved mounting surface 206 for mounting the battery mount 200 onto the jack apparatus 20 and specifically the motor housing 132 (FIG. 10). In operation, though not shown, the motor housing 132 or battery mount 200 may include any related electrical components for both supplying or connecting power from an external, typically rechargeable, battery (not shown) to the electric motor 130 and for then selectively operating the motor 130 to raise or lower the jack apparatus 20, as for example by providing a simple toggle switch for up-down operation, or controlling the motor 130 so as to rotate clockwise or counterclockwise as appropriate. The battery mount 200 may be installed on the jack apparatus 20 and specifically the motor housing 132 employing screws or the like or any other fastening means now known or later developed sufficient to operably secure such assembly for use.

Finally, turning to FIGS. 14-18, there are shown perspective views of an alternative jack apparatus 20 and of its related components such that the jack 20 is repurposed here as a breaching tool versus a more traditional jack arrangement for lifting or moving, though in practice they are much the same operation in terms of applying an increased force to an object, with the difference being on what object and to what end, such that the components of the jack apparatus 20 here designed for engaging such other optional structure and for other purposes being configured slightly differently relative to those components disclosed herein for the first exemplary embodiment such as the top cap 50, the foot 60, and even the retainer hook 100, some or all of which it will be further appreciated may be practiced in conjunction with an "electric" and/or "manual" jack setup as herein described. And by "breaching" it is simply meant that in using the jack apparatus 20 something can be forced open or broken through, as when a rescue operation might be underway and a door or wall must be penetrated or opened to gain access to a space where a person may be trapped, for example. As such, and with reference first to FIG. 14, there is shown an alternative jack apparatus 20 structurally much like that of FIGS. 1 and 10-12, again demonstrating the jack's versatility and multi-purpose capability, here with the top cap 50 replaced at the upper end of the jack 20 with a breaching top foot 210 and the foot 60 at the lower end of the jack 20 replaced with a breaching bottom foot 220. The breaching top foot 210, like the top cap 50, may be installed on the upper end of the jack 20 and specifically the motor housing 132 again employing any fastening or assembly means now known or later developed. And the breaching bottom foot 220 can again be pivotally installed on the foot support 46 (FIGS. 10 and 11) much like the standard foot 60. As shown, with further reference to the enlarged perspective views of FIGS. 15 and 16, both the breaching top foot 210 and bottom foot 220 are formed with knurled or textured outwardly-facing surfaces 212, 222, respectively, to further facilitate positive or frictional engagement with a surface that is to be breached or is to be used for leverage. With the breaching bottom foot 220, the bottom or outwardly-facing surface 222 is supported on a pair of offset mounting legs 224 each having mounting holes 226, again to enable pivotal attachment of the breaching bottom foot 220 to the lower inner tube 42 and specifically its foot support 46. With continued reference to FIG. 14 and now the enlarged perspective view of FIG. 17, there is shown an intermediate breaching clamp foot 230 that is selectively mountable on the adjustable clamp assembly 70 in much the same way as the hook 100 (FIGS. 8 and 9). And similarly to the hook pad 106 of the standard hook 100, the breaching clamp foot 230 is formed having a breaching clamp foot pad 232 also similar to the outwardly-facing surfaces 212, 222 of the breaching top foot 210 and bottom foot 220 in terms of having a knurled or textured surface for better grip or engagement of a surface to which a force is to be applied by the jack apparatus 20. The breaching clamp foot body 234 is formed so as to extend along or parallel to the jack body 30, at least in part, so as to further mechanically support the breaching surface 232, and though not shown is also formed with a downwardly projecting retaining member for engagement with the pocket 86 of the clamp assembly 70 as in other attachment embodiments herein. Those skilled in the art will appreciate that the three functional breaching surfaces of the jack apparatus 20 configured as a breaching tool offer tremendous versatility in engaging various objects or surfaces during use, particularly against considering the axial and rotational adjustability of the clamp assembly 70 and thus the position or orientation of the breaching clamp foot 230. Again, a variety of other configurations of such breaching accessories beyond those shown and described are possible according to aspects of the present invention without departing from its spirit and scope. By way of further illustration and not limitation, and now with reference to FIG. 18, a further alternative jack apparatus 20 configured as a breaching tool is shown as generally comprising a breaching jaws assembly 240 for additional or different functionality or use in appropriate contacts where "scissors action" may be beneficial, such as in cutting through a hinge, bolt, lock, or other structure that is preventing access to an area, again, where someone may be trapped or in trouble, for example. In the exemplary embodiment, the breaching jaws assembly 240 generally comprises opposed jaw members 242, 244 that are hingedly or pivotally engaged with each other and with the bottom of the jack apparatus 20 or jack body 30, and specifically the lower inner tube 42 or more specifically its foot support 46 (FIGS. 10 and 11), so as to be operably assembled on the jack apparatus 20. To complete the breaching jaws assembly 240 and facilitate actuation of the opposing jaw members 242, 244, the first jaw member 242 is formed with a relatively longer arm 243 that has pivotally mounted at its free end, or its end opposite the hinge point of the jaw members 242, 244, a linkage 246 that then terminates opposite the jaw arm 243 in a pivotally attached retainer 248 fashioned much like the standard retainer 90 (FIGS. 6 and 7) of the first exemplary embodiment so as to engage the pocket 86 of the clamp assembly 70. As such, effectively a kinematic mechanism is formed by mechanically connecting the free end of one of the jaw members 242 with a fixed point defined by the location of the clamp assembly 70 along the upper outer tube 32 of the jack body 30 and connecting the other jaw member 244 at the foot support 46, along with pivotal coupling of the first jaw member 242, such that axial movement of the telescoping lower inner tube 42 relative to the upper outer tube 32 mechanically and kinematically operates the breaching jaws assembly 240 so as to selectively open or close the jaws, or shift the first and second jaw members 242, 244 relative to each other. While a particular arrangement or configuration of the breaching jaw assembly 240 is shown and described, and particular geometries of the opposed jaw members 242, 244, those skilled in the art will once more appreciate that the invention is not so limited, but instead a wide range of other such breaching, recovery, and other attachments and thus jack configurations are possible according to aspects of the present invention without departing from its spirit and scope, such that the illustrated embodiments are to be understood as exemplary and non-limiting. And relatedly, all such components can be formed of any suitable material and by any suitable manufacturing method now known or later developed.

Now with reference to FIGS. 19A and 19B, in use of an exemplary jack apparatus 20 according to aspects of the present invention as shown and described herein, such may be used to lift or "jack up" a vehicle V. As illustrated, the vehicle V has been equipped with a retainer 90 as by welding or bolting such retainer 90 on the chassis C with its retainer surface 98 facing out and thus with the retainer flange 96 spaced from the chassis C to form or expose the undercut defined by the flange 96 in conjunction with the stepped-down retainer post 94 (FIGS. 6 and 7). When employing a bolt B as shown in FIG. 7 to mount the retainer 90, it will be appreciated that an appropriate hole (not shown) can be formed or accessed on the chassis C, a component of the suspension S, or at some other appropriate location on the vehicle V for receipt of the bolt B, with a nut (not shown) or other such fastener then employed in securing the bolt B and thus the retainer 90 on the vehicle V. With the vehicle V so equipped with a retainer 90 as shown in FIG. 19A, the jack 20 can be set to an appropriate length as by telescopically adjusting the inner tube 42 relative to the outer tube 32 for clearance of the necessary parts relative to the distance between the ground G or other surface on which the vehicle V and thus the jack apparatus 20 are positioned and the vehicle V or specifically the chassis C or other location of the retainer 90. Of course, the orientation and location along the jack's outer tube 32 of the clamp assembly 70 also allows for quick and convenient "sizing" or "configuring" of the jack 20 for use. As indicated by the dashed line, ultimately, the jack apparatus 20 would be shifted into position relative to the vehicle V such that the pocket 86 (FIG. 5) of the clamp assembly 70 is oriented adjacent to and then engaged with the retainer 90 as by the retainer flange 96 being received within the pocket 86 so as to effectively couple the jack 20 with the vehicle V. To the extent the foot 60 of the jack 20 is not already in contact with the ground G, the jack 20 can be operated, as through interaction with the battery mount 200 and related electronic controls in the case of the "electric jack" or as through driving a driver (not shown) in the "manual jack" arrangement, so as to extend the inner tube 42 relative to the outer tube 32 until the foot 60 contacts the ground G. It will be appreciated by those skilled in the art, with reference now to FIG. 19B, that continued operation or telescopic extension of the jack apparatus 20 will thus serve to lift the vehicle V relative to the ground G until the operator has sufficient clearance to perform whatever necessary inspection or repair is needed, such as a tire change or any activity requiring access to the underside of the vehicle V in whole or in part. At all times while the vehicle V is lifted or "jacked up" it will also again be appreciated that in the exemplary embodiment due to the positive engagement between the jack's clamp assembly 70 and the retainer 90 installed on the vehicle V there is reduced risk of the vehicle V shifting or coming or falling off the jack 20. Alternatively, in any case where a vehicle V or other object to be lifted is not configured with a retainer 90, the top cap 50 (FIGS. 1 and 2) in the case of the "electric jack" setup or the hook 100 (FIGS. 8 and 9) engaged with the clamp assembly 70 in either the "electric jack" or "manual jack" setup can be employed instead, as by seating the notch 52 of the top cap 50 or the hook legs 104 or hook pad 106 of the hook 100 on or under the chassis C, suspension S, or other appropriate location on the vehicle V or other object to be lifted. Those skilled in the art will appreciate that a wide variety of such configurations and uses are again possible in conjunction with a jack apparatus 20 according to aspects of the present invention without departing from its spirit and scope.

In sum regarding a jack apparatus according to aspects of the present invention as disclosed herein in various embodiments and its representative features and benefits in operation and use, such is shown to have a number of functional improvements and advantages, including but not limited to it being relatively simple to use, in the case of an electric jack with single button operation of a high efficiency electric motor that is powered by a standard drill battery or the like, such that numerous operations can be made on a single battery charge, and any such jack having quick-release height and orientation adjustment along with low-profile mountable male retainers configured to engage a female receiver of the adjustable clamp assembly so as to mechanically lock or couple the jack to a vehicle's suspension or chassis. In fact, with two chassis-mounted tabs (not shown) the jack can be stored between such opposite points when not in use. In other uses, the jack can be used as a recovery tool or a breaching tool, for example, further demonstrating its versatility and benefits. Again, those particular embodiments shown and described herein, including material or dimensional call-outs, if any, or performance ratings such as travel or load capacity, are to be understood as merely illustrative of features and aspects of the present invention and non-limiting. By way of further illustration, with only a few design changes such as using a ball screw for the actuator instead of acme thread and/or a friction-style clutch instead of a ball/socket clutch different performance and higher load capacity can be achieved, such as five thousand pounds (5,000 lbs.) or more. And the addition of a manual override to any such electric jack would allow a user to drive the jack via an external source such as an impact gun or ratchet should the power source or electric motor fail to work. At a high level, among other features and benefits, the jack points in any such jack such as a male bolt-on or weld-on jack point that secure to the suspension, chassis, or other structural component of the vehicle then positively engaging the female receiver on the jack in use ensures that the vehicle cannot roll, slide, slip, or fall off the jack, creating a more secure and safe engagement method for lifting the vehicle or working under the vehicle while it is elevated. And further regarding jack storage, the exemplary embodiment jack is configured such that a single design chassis mount can be used to receive either end of the jack when the jack is stored. This way the jack can be put into storage facing either direction and when later stored can be put in again facing the opposite direction without modifying or replacing any parts, adding to the versatility and convenience of the design. And in all uses, including storage, the jack extends and holds itself in place without any locks, clips, pins, clasps, or other holding devices required. Outside the jack itself there are no moving parts, particularly as to the drive assembly, all of which is effectively self-contained within the jack in a sleek, relatively low profile, and safe in-line "package." The jack's operation and effectively locking at any travel position is achieved by an accumulation of resistance in the internal components of the jack, preventing unwanted movement. Once more, other embodiments and related advantages are possible according to aspects of the present invention without departing from its spirit and scope.

In closing, regarding the exemplary embodiments of the present invention as shown and described herein, it will be appreciated that a jack apparatus is disclosed and configured for versatile, efficient, and safe use in multiple operational modes. Because the principles of the invention may be practiced in a number of configurations beyond those shown and described, it is to be understood that the invention is not in any way limited by the exemplary embodiments, but is generally able to take numerous forms without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

In some embodiments, the numbers expressing dimensions, quantities of components or ingredients, properties such as force, weight, concentration, reaction conditions, and so forth, used to describe and claim certain embodiments of the inventive subject matter are to be understood as being modified in some instances by the terms "about" or "approximately." Accordingly, in some embodiments, the numerical parameters set forth in the written description and any attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in any specific examples are reported as precisely as practicable. The numerical values presented in some embodiments of the inventive subject matter may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. The recitation of numerical ranges of values herein is merely intended to serve as a shorthand method of referring individually to each separate value falling within the range. Unless otherwise indicated herein, each individual value of a numerical range is incorporated into the specification as if it were individually recited herein. Similarly, all lists of values should be considered as inclusive of intermediate values unless the context indicates the contrary.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the application should be construed as indicating any non-claimed element essential to the practice of the invention.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While aspects of the invention have been described with reference to at least one exemplary embodiment, it is to be clearly understood by those skilled in the art that the invention is not limited thereto. Rather, the scope of the invention is to be interpreted only in conjunction with any appended claims here or in any patent application claiming the benefit hereof, and it is made clear that the inventor(s) believe that the claimed subject matter is the invention.

What is claimed is:

1. A jack apparatus for applying force to an object, the apparatus comprising:
   a jack body having an outer tube and an inner tube telescopically received within the outer tube; and
   a selectively repositionable clamp assembly installed on the outer tube of the jack body, the clamp assembly being both slidable and rotatable along the outer tube and selectively engageable with the object to which force is to be applied, wherein the clamp assembly has a pocket for selective removable receipt of a force application component configured for engagement with the object, the force application component having an engagement feature configured for selective engagement within the pocket, and wherein the clamp assembly further has a clamp body and a clamp undercut formed in the clamp body and a clamp retaining plate formed on the clamp body over the clamp undercut so as to form the pocket, the clamp retaining plate having an upwardly-opening clamp retaining plate notch configured to accommodate the force application component.

2. The apparatus of claim 1 wherein the force application component comprises a hook having a hook body terminating proximally in a hook pad and distally in at least one hook leg and being formed intermediately with a hook retaining plate defining the engagement feature, wherein the hook pad and the at least one hook leg are configured for selective engagement with the object upon operation of the apparatus.

3. The apparatus of claim 2 wherein the hook body is further formed having a hook undercut, the hook retaining plate partially overlying the hook undercut.

4. The apparatus of claim 1 wherein the force application component comprises a retainer having a retainer body formed with a retainer flange defining the engagement feature.

5. The apparatus of claim 4 wherein the retainer body is further formed with a retainer post offset from the retainer flange.

6. The apparatus of claim 5 wherein the retainer is installed on the object to which force is to be applied as by welding or fastening the retainer post to the object such that the retainer flange is spaced from the object.

7. The apparatus of claim 6 wherein a bolt is affixed to the retainer post in facilitating installing the retainer on the object.

8. The apparatus of claim 6 wherein the object is a vehicle chassis or suspension component.

9. The apparatus of claim 1 wherein a breaching top foot is provided on the outer tube and a breaching bottom foot is provided on the inner tube, the breaching top foot and the breaching bottom foot configured to cooperate in applying force to the object upon operation of the apparatus.

10. The apparatus of claim 9 further comprising a breaching clamp foot having a breaching clamp foot body defining the engagement feature and further having a breaching clamp foot pad formed on the breaching clamp foot body, the breaching clamp foot pad configured to cooperate with one or both of the breaching top foot and the breaching bottom foot in applying force to the object upon operation of the apparatus.

11. The apparatus of claim 1 wherein a breaching jaws assembly is provided on the jack body, the breaching jaws assembly having pivotally opposed first and second jaw members provided on the inner tube of the jack body with a first jaw member arm integral with the first jaw member pivotally coupled to a retainer defining the engagement feature and selectively removably received within the pocket of the clamp assembly installed on the outer tube of the jack body via a linkage pivotally interconnecting the first jaw member arm and the retainer, whereby operation of the apparatus selectively operates the breaching jaws assembly.

12. The apparatus of claim 1 wherein a top cap is provided on the outer tube, the top cap having an axially outwardly-opening notch configured for engagement with the object.

13. The apparatus of claim 1 wherein a support foot is provided on the inner tube, the support foot having a downwardly-facing concave bottom surface configured for contacting the ground during use of the apparatus.

14. The apparatus of claim 1 further comprising a drive assembly for selectively telescopically shifting the inner tube relative to the outer tube.

15. The apparatus of claim 14 wherein the drive assembly comprises an electric motor coupled to a gear assembly via a drive shaft, the electric motor interfacing with a battery mount installed on a motor housing provided on the outer tube.

16. The apparatus of claim 15 wherein the gear assembly is operably engaged with a leadscrew mechanically coupled with the inner tube.

17. A jack apparatus for lifting a vehicle, the apparatus comprising:
    a jack body having an outer tube and an inner tube telescopically received within the outer tube;
    a retainer having a retainer body formed with a retainer flange and with a retainer post offset from the retainer flange, the retainer being configured to be installed on the vehicle to be lifted as by welding or fastening the retainer post to a chassis or a suspension component of the vehicle such that the retainer flange is spaced from the chassis or the suspension component; and
    a selectively repositionable clamp assembly installed on the outer tube of the jack body, the clamp assembly having a clamp body shiftable along the outer tube and a pocket formed in the clamp body for selective removable receipt of the retainer as by engagement of the retainer flange within the pocket, whereby upon installation of the retainer on the vehicle operation of the apparatus so as to extend the inner tube relative to the outer tube causes a lifting force to be applied to the vehicle through the clamp assembly affixed on the outer tube and engagement of the retainer installed on the vehicle with the pocket of the clamp assembly.

18. A jack apparatus for applying force to an object, the apparatus comprising:
    a jack body having an outer tube and an inner tube telescopically received within the outer tube, wherein a breaching top foot is provided on the outer tube and a breaching bottom foot is provided on the inner tube, the breaching top foot and the breaching bottom foot being formed at respective opposite ends of the jack body each with a textured outwardly-facing surface and configured to cooperate in applying force to the object upon operation of the apparatus; and
    a drive assembly for selectively telescopically shifting the inner tube relative to the outer tube, the drive assembly comprising an electric motor coupled to a gear assembly via a drive shaft, the electric motor, gear assembly, and drive shaft being axially aligned and fully contained within the jack body, the electric motor interfacing with a battery mount installed on a motor housing provided on the outer tube;

wherein the jack apparatus is self-powered and there are no drive assembly components outside of the jack body.

19. A jack apparatus for lifting a vehicle, the apparatus comprising:

a jack body having an outer tube and an inner tube telescopically received within the outer tube;

a hook having a hook body terminating proximally in a hook pad and distally in at least one hook leg and being formed intermediately with a hook retaining plate, wherein the hook pad and the at least one hook leg are configured for selective engagement with the vehicle upon operation of the apparatus; and a selectively repositionable clamp assembly installed on the outer tube of the jack body, the clamp assembly having a clamp body shiftable along the outer tube and a pocket formed in the clamp body for selective removable receipt of the hook as by engagement of the hook retaining plate within the pocket, whereby upon engagement of the hook with the clamp assembly operation of the apparatus so as to extend the inner tube relative to the outer tube causes a lifting force to be applied to the vehicle through the clamp assembly affixed on the outer tube and engagement of one or more of the hook pad and the at least one hook leg with the vehicle.

20. A jack apparatus for applying force to an object, the apparatus comprising:

a jack body having an outer tube and an inner tube telescopically received within the outer tube;

a top cap formed on the outer tube opposite the inner tube, the top cap having an axially outwardly-opening notch configured for engagement with the object; and a selectively repositionable clamp assembly installed on the outer tube of the jack body, the clamp assembly having a clamp body shiftable along the outer tube, whereby operation of the apparatus so as to extend the inner tube relative to the outer tube causes a lifting force to be applied to the vehicle through either one of the top cap formed on the outer tube and/or the clamp assembly affixed on the outer tube.

* * * * *